United States Patent
Gilbert

(10) Patent No.: US 9,559,531 B2
(45) Date of Patent: Jan. 31, 2017

(54) UNIVERSAL SYSTEM FOR CHARGING AT LEAST ONE PORTABLE DEVICE

(71) Applicant: ERGYLINK, Levallois-Perret (FR)

(72) Inventor: Jerome Gilbert, Levallois-Perret (FR)

(73) Assignee: ERGYLINK, Levallois-Perret (FR)

(*) Notice: Subject to any disclaimer, the term of this patent is extended or adjusted under 35 U.S.C. 154(b) by 333 days.

(21) Appl. No.: 14/107,807

(22) Filed: Dec. 16, 2013

(65) Prior Publication Data

US 2014/0103868 A1  Apr. 17, 2014

Related U.S. Application Data

(62) Division of application No. 12/563,537, filed on Sep. 21, 2009, now abandoned.

(30) Foreign Application Priority Data

Jul. 31, 2009  (FR) ................................... 09 03817

(51) Int. Cl.
*H02J 7/02*  (2016.01)
*H02J 7/00*  (2006.01)

(52) U.S. Cl.
CPC ............ *H02J 7/0026* (2013.01); *H02J 7/0044* (2013.01); *H02J 7/025* (2013.01); *H02J 7/0027* (2013.01); *H02J 7/0072* (2013.01)

(58) Field of Classification Search
USPC ................................................ 320/108, 111
See application file for complete search history.

(56) References Cited

U.S. PATENT DOCUMENTS

| | | | |
|---|---|---|---|
| 5,367,242 A | 11/1994 | Hulman | |
| 7,344,414 B2* | 3/2008 | Kuo | H01R 13/641 439/620.01 |
| 7,388,352 B2 | 6/2008 | Bayne et al. | |
| 7,397,654 B2 | 7/2008 | Mori | |
| 7,405,535 B2 | 7/2008 | Frerking et al. | |
| 7,471,062 B2 | 12/2008 | Bruning | |
| 7,977,825 B2 | 7/2011 | Gilbert | |
| 2005/0156577 A1 | 7/2005 | Sully | |
| 2005/0231161 A1 | 10/2005 | Jones et al. | |
| 2006/0043929 A1 | 3/2006 | Koyanagi et al. | |
| 2006/0264094 A1* | 11/2006 | Young | H02G 11/02 439/501 |
| 2007/0210747 A1* | 9/2007 | Brandon, II | H02J 7/0003 320/114 |
| 2008/0164840 A1* | 7/2008 | Kato | H01F 27/2804 320/108 |
| 2008/0174267 A1 | 7/2008 | Onishi et al. | |
| 2008/0221888 A1* | 9/2008 | Greene | G11B 19/02 704/246 |

(Continued)

*Primary Examiner* — Robert Grant
(74) *Attorney, Agent, or Firm* — Young & Thompson

(57) ABSTRACT

A universal system for recharging at least one portable appliance, the dedication of which is being capable from a device (4) of suiting any portable appliance version with at least one adapter (6) which may be specific in all or part of the relevant portable appliance. The system, in its preferred alternative embodiments, allows simultaneous or sequential recharging of a plurality of portable appliances. With the system it is further possible to save electric energy in a stand-by mode and the risks of fire and electrocution in the case of any dysfunction are reduced as compared with the solutions of the state of the art.

20 Claims, 14 Drawing Sheets

(56) References Cited

U.S. PATENT DOCUMENTS

| | | | |
|---|---|---|---|
| 2009/0072784 A1* | 3/2009 | Erickson | H02J 7/0027 320/108 |
| 2009/0096399 A1* | 4/2009 | Chen | H01M 10/44 320/134 |
| 2009/0115370 A1 | 5/2009 | Vasko et al. | |

* cited by examiner

UNIVERSAL SYSTEM FOR CHARGING AT LEAST ONE PORTABLE DEVICE

TECHNICAL FIELD

The present invention is located in the field of small electrical equipment, it relates to an accessory for recharging at least one portable device. The invention more particularly relates to recharging telephones and/or other portable electrical or electronic appliances of daily use.

STATE OF THE PRIOR ART

The chargers of the state of the art are most often specific accessories provided by the manufacturers of portable devices. Although there is work aiming at standardizing the interface between the chargers and the devices to be recharged for decoupling the provision of devices and chargers, the pool of existing chargers is still heterogeneous. This heterogeneity forces the users to keep and carry in their travels as many chargers as there are appliances to be recharged. On the other hand, in families where most of the members have a simple or multifunctional portable telephone and if necessary, other portable appliances such as digital audio readers, digital cameras, game consoles, etc., a significant increase in the number of chargers is witnessed. In addition to the unsightly character of the individual chargers, the fact that they occupy a non-negligible portion of the wall electric outlets in dwellings, this proliferation leads to a waste of electric energy which is significant at the scale of a country and to an increase in the likelihood of accidents related to failures of the chargers. A so-called standby killer intelligent multi-outlet disclosed in the patent FR0605627 (GILBERT) from the same inventor, the present invention of whom is somewhat a sequel thereto, is known as well as chargers disclosed in patents U.S. Pat. No. 7,405,535, U.S. Pat. No. 7,471,062 et U.S. Pat. No. 5,367,242.

SHORT DISCUSSION OF THE INVENTION

The object of the present invention is to at least partly find a remedy to the problems mentioned earlier by proposing a universal system for recharging at least one portable appliance. Certain preferred alternative embodiments of the invention further include means for at least partially disconnecting them from the electrical mains when all the appliances are considered as having been recharged or when they are removed from the system. With this, it is possible to reduce, or even in certain types of application, to completely suppress residual consumption at the end of charging or when the charger is disconnected from the appliance to be recharged. Further with the invention, it is possible to decrease the risk of fire and/or reduce the risk of electrocution in the case of dysfunction as compared with solutions of the state of the art. The invention is useful for its users by the benefits provided to them in terms of convenience of use, savings and safety. The invention is also useful for manufacturers of portable electronic appliances in that it may contribute to transferring the supply of the chargers to suppliers specialized in small electric equipment. With the invention, they may propose attractive and innovative products in the field of chargers and of products which are potentially suitable for all brands of portable appliances. Indeed, the chargers are not very technological objects with low added value, and without any marketing issue for manufacturers of portable electronic appliances. By parting from this supply, they may reduce their costs, reduce the bulkiness and the weight of their packages and limit the risks to which they are exposed. The risks in the case of dysfunction of the chargers may have significant financial consequences for the companies and a negative impact on the image of the generally well-known brands under which the appliances are sold.

SHORT DESCRIPTION OF THE DRAWINGS

Other advantages and features of the invention will become apparent upon examining the detailed description of embodiments which are by no means limiting, and of the appended drawings wherein.

DETAILED DISCUSSION OF THE INVENTION

Figure 1:
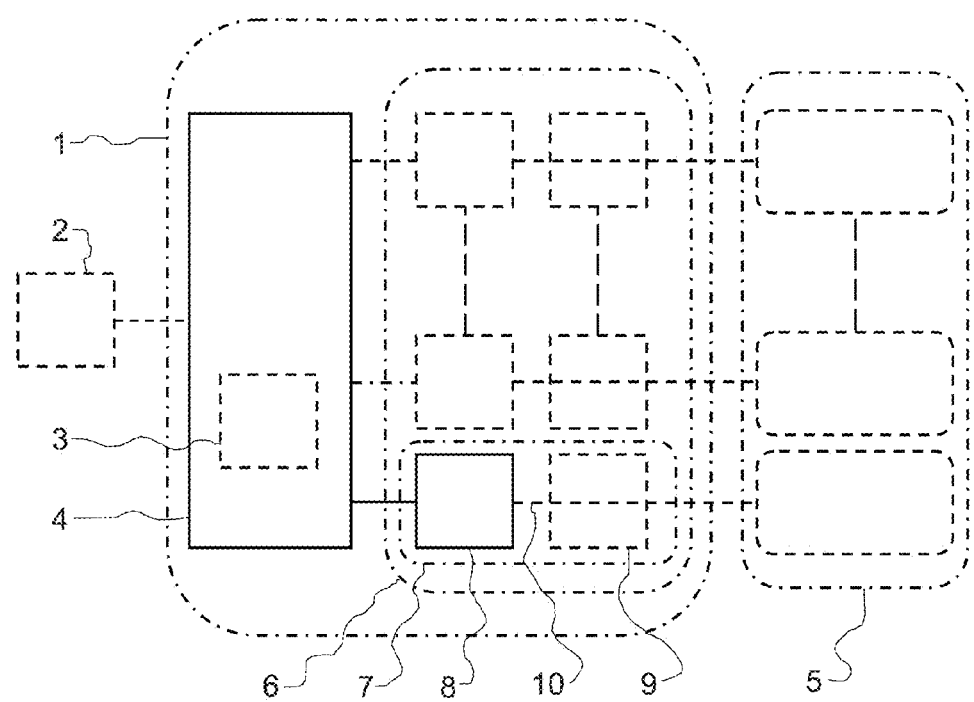
FIG. 1 illustrates the architecture of the system according to the invention.

The invention relates to a universal system for recharging at least one portable appliance which comprises:
- a device for recharging at least one portable appliance by providing it with electric energy; and
- at least one adapter for transferring electric energy in a discontinuous manner from said device to the at least one portable appliance.

By universal is meant within the scope of the system according to the invention, the capability of recharging portable appliances of types and/or versions and/or brands and/or from different manufacturers, if need be by means of suitable adaptations to specificities of the relevant portable appliances.

The invention in its preferred embodiments provides the support and/or the recharging of several portable appliances in a simultaneous and/or sequential way. By support of several portable appliances in a simultaneous and/or sequential way, is meant the capability of receiving a plurality of portable appliances in order to recharge them at the same time or in turn respectively. By recharging several portable appliances in a simultaneous and/or sequential way is meant the capability of transferring electric energy to a plurality of portable appliances in order to recharge them at the same time or, for all or part of them respectively, according to any handling process which takes time into account.

Now this being the case, there is no departure from the scope of the invention in the case of an application exclusively dedicated to recharging a single portable appliance of a given version or in the case of an application dedicated to all or part of a range of portable appliances of a given brand.

By adapter for transferring energy from said device to said at least one portable appliance, is meant any means providing the energy transfer between said device and said at least one portable appliance to be recharged. By discontinuously transferring electric energy from said device to said at least one portable appliance should be understood the fact that the recharging voltage is not permanently provided by the device to said at least one portable appliance to be recharged, this regardless of the wave form of the recharging voltage which may be an AC voltage or in most cases a DC voltage. It should be noted that the system according to the invention, in most alternative embodiments, and within the limit of the maximum capabilities of providing current from the relevant sources, only handles the supply of the recharging voltage. Indeed, when dealing with evolved portable appliances such as portable telephones comprising a charging supervisor, the handling of the recharging current demanded by the appliance is handled by the latter. In addition to the fact that the feature of discontinuously supplying the recharging voltage is at the basis of at least one portion of the benefits of the invention, it also contributes to distinguishing it from known solutions, notably from those used for recharging wireless home telephones which are continuously powered by their base. It should be noted that with the invention provision is made for implementing handling of the discontinuity for supplying the recharging voltage to at least one portable appliance in one or several points of the system. For example, the discontinuity may be dealt with in all or part of said device and/or in said adapter without departing from the scope of the invention.

The invention provides that the system further comprises guiding and/or maintaining means specific or adaptable to the dimensions of said at least one portable appliance in order to ensure positioning of the latter so that it may be recharged.

It is provided that the system according to the invention comprises means for recharging at least one portable appliance among a plurality of them having different dimensional and/or electrical characteristics.

Handling of this heterogeneity requires suitable means. Thus, means for guiding and/or maintaining said at least one portable appliance are provided in order to be able to receive appliances and to maintain them in a position suitable for recharging in a recessed housing and/or on a prominent support. According to the alternative embodiments of the invention, all or part or these means are comprised in said device and/or in said adapter. These may be adaptation means which are specific to a given portable appliance or to a given family of portable appliances having identical characteristics, at least for the part concerned by the recharging. Even more advantageously, these may be adaptable means capable of receiving a plurality of portable appliances having at least one different dimensional characteristic. Thus, it is provided that said adaptable means use forces which are exerted on at least two portable appliances having at least one different dimensional characteristic, said forces being exerted on the actual portable appliance alone and/or on an intermediate adapter, in order to ensure guidance to the charging position and/or maintaining it therein, respectively. Said forces are for example gravity, return forces of at least one spring operating in traction and/or in compression or further exerted by spring-forming materials, magnetic attraction or repulsion forces, said forces being used alone or as a combination.

The invention provides that the system further comprises at least one cable winder and/or one housing for concealing the excess length of at least one cable.

This concerns said device and/or said adapter and mainly meets needs for convenience and/or of an aesthetic order. The cable length to be concealed may for example more particularly concern said device if this is a cable for connection with an external energy source. The cable length to be concealed may also concern at least one cable within the scope of said at least one adapter for either one or both interfaces for connection with the device or with said at least one portable appliance. It is further provided that the technical means for concealing at least one excess cable length may be based on winders. These may be so-called automatic winders by the use of a spring for exerting a force allowing the cable to be wound up or further simple winders, i.e. means with which the user may himself/herself wind up the excess length. Solutions for concealing excess cable length based on suitable housings are also provided. This may for example be a retention housing provided between the point for connecting the relevant cable and the exit point of the cable from the outer casing of the relevant object. Thus, with a simple exit point allowing the cable to slide freely, it is possible to have the excess portion of the cable enter the retention housing. Generally it is sufficient to pull on the cable, one portion of which has been concealed beforehand in the housing, in order to extend the external portion. When said housing is common for retaining the excess portion of several cables, it is advantageous to provide an access for disentangling their excess portion if necessary. For all the types of winders or solutions based on a housing for containing the excess portion of at least one cable, by applying blocking means, it is advantageously possible to maintain the wound portion in place without it unwinding by itself and to maintain free of any return force the length of the terminal portion which the user has chosen to leave free.

The invention provides that the system further comprises a bearing surface for receiving the portable appliances to be recharged.

By bearing surface is meant any planar surface on which the user is invited to lay down said at least one portable appliance during its recharging. The bearing surface according to the invention may be rigid, flexible or advantageously made in flexible materials, in order to allow compact packaging in which the bearing surface, called in this case a <<charging carpet>> may be rolled. The bearing surface is advantageously made in a soft, non-slip and non-abrasive material in order not to damage the portable appliances which it receives. Advantageously, the bearing surface provides a surface able to be marked for decorative purposes and/or as a communication medium, notably an advertising medium. All or part of the markings may in certain alternatives be made by the user in the form of decorative options by suitable means and/or these may be one or several areas provided for writing messages and/or for marking the name of the users to which determined areas are assigned if necessary, with advantageously an erasable writing means.

The invention in certain alternative embodiments provides that the bearing surface is a passive component of the system, the essential function of which is to provide a support suitable for the portable appliances to be recharged. In other alternative embodiments, the bearing surface further provides a function for automatically detecting at least one effect from an intervention of the user on the system or in his/her environment. This type of alternative is provided as an optional accessory connectable to the device and which may be distributed separately. In this case, conventional starting means such as a push-button on the device, allows the use of the device according to the invention without said bearing surface. In preferred alternative embodiments, said bearing surface is further used as a means for transferring electric energy into said at least one portable appliance.

It is provided that the means for transferring electric energy into the portable appliances laid on said bearing surface utilize direct electric conduction or energy transfer by induction. As regards the transfer by direct electric contact, these may for example be point contacts made for example with one or more conducting tips per terminal, the tips being retractably mounted with a spring or using a material forming a spring in order to exert a force towards the receiving pad of the opposite contact which is in connection with a portable appliance. Thus said at least two metal receiving pads forming the contacts opposite to those which are integral with said bearing surface for direct transfer of electric energy, may be smoothed and continuous with the surface which is generally found forming the back of the portable appliance or of overcladding. Thus, the attractiveness of the portable appliance is not substantially modified and no surface irregularity risks scratching persons, surfaces or clothing.

In other alternative embodiments for transferring energy through direct electric contacts, it is provided that said bearing surface should at least consist of a plurality of metal strips or areas, the length and width of which are substantially equal in order to form an alternation of very low voltage power supply terminals with one or two dimensions, respectively. Thus, each individual strip or area respectively has at least one strip or adjacent area connected to the opposite terminal, so that the contacts integral with the portable appliances to be recharged or with their overcladding, which are spaced apart by an odd multiple of the pitch separating said strips or areas, are nearly always found in close contact with two terminals in a position suitable for recharging.

In other preferred alternative embodiments of the invention, energy transfer is accomplished by induction by means of at least one flat inductor, a so-called primary inductor, which is located under the bearing surface. At least one polar part made in a material, capable of deviating the lines of the alternating magnetic field used, advantageously completes said at least one primary inductor in order to increase the efficiency of the coupling with said at least one secondary inductor receiving the energy located in the portable appliance or in its adapter which is placed above.

Advantageously, bearing areas dedicated to a given portable appliance are materialized by markings, this embodiment arrangement allows individualized handling of the recharging of each appliance and if necessary easy recognition by the user of each portable appliance which is in particular useful within the scope of the voice functions of the invention shown hereafter.

One indicator per appliance, per adapter or per individualized charging circuit advantageously completes the system in that it is possible to instantaneously check, whether the appliance upon its laying down is in a position suitable for recharging: non-lighting of the indicator intuitively inviting the user to change the position of the appliance until lighting of the indicator is seen.

In the cases when the means used for transferring electric energy do not allow sure determination of the polarity of the connection established with the portable appliance or its adapter, provision is made for having diodes mounted as a rectifier bridge in the adapter or in the portable appliance in order to definitely recondition as expected the polarity of the recharging voltage before its use. Further, the voltage provided by the device will be adapted so as to take into account the voltage drop of the diodes so that the portable appliance receives the suitable rated recharging voltage.

In the language of the invention, the use of said bearing surface for transferring recharging energy causes it to enter the category of said first sub-assembly of said at least one adapter.

Of course, all or part of the unitary functions associated with said bearing surface may be combined without departing from the scope of the invention.

The invention provides that the system further comprises means for recording and/or reproducing and/or handling voice messages.

Considering the particularly relevant use of the system according to the invention in the general public as a centralized recharging point for portable appliances of daily use, accordingly the most suitable localization of the system in an entrance or another location where users pass by systematically, it is particularly advantageous to include in the system according to the invention, means for recording and/or reproducing and/or handling voice messages. It is provided that the technical association between the voice portion and the components of the system relating to the recharging of portable appliances according to the invention should give rise to functional synergies. For example, the message(s) which have not yet been listened to, may be read automatically upon starting to charge a portable appliance after the recordings, until all the messages are erased, each addressee reputed to erase the message intended for him/her after having listened to it. Of course, many functional alternatives are possible without departing from the scope of the invention.

In a basic version, it is provided that the voice means are based on a simple global recording and reproduction function without distinguishing any addressee. Handling of the addressees of voice messages is however provided in the preferred alternative embodiments. In this case, means are proposed for selecting the addressee(s) of the voice messages during the recording and reproduction steps. Interaction means with the user are further proposed for handling the messages: for example selecting the addressee during the recording step if necessary, listening again, erasing, switching to the following or previous message, at the beginning or at the end of a list, signalling a new message with indication of its addressee if necessary, etc. An advantageous additional function is the <<answer>> function for recording a new message intended for the transmitter of the message which has just been listened to, this allowing a dialog to be established between users which are not present simultaneously. The interaction with the user may advantageously be accomplished with very simple and reliable means, the use of which is easily understandable by anybody, such as for example with push-buttons, indicator lamps, and associated markings. The interaction with the user may of course use more sophisticated means, such as for example a touch screen. The use of said at least one portable appliance as a support of the interaction with the user is also provided, the connection between the resources of the system according to the invention and that of the portable appliance being advantageously able to use a local communication standard such as Bluetooth or WiFi. Conversely, the use of the resources of the voice portion of the system as a hands-free sub-assembly by a telephone for sharing a communication between several users is also provided. The voice messages recorded in digital form will advantageously be stored in non-volatile memory. The optional addition of a real time clock allows time-stamping of voice messages. The voice portion of the system may advantageously be proposed as a detachable sub-assembly capable of autonomy by the presence of a battery maintained in a charged condition by the device according to the invention. The alternative capable of autonomy is particularly useful for recording lists of articles to be supplied while producing the inventory in different storage locations with said hand-held voice sub-assembly, detached from the device. In a particularly elaborate alternative, the voice portion of the system is capable of copying voice messages as digital files in a standard format into a memory of a portable appliance for reproduction during mobility, for example within the scope of a list of articles to be supplied which may thus be consulted with delayed time on the supply location. In certain alternatives, the voice portion comprises a port, for example an OTG host USB port or equivalent as well as a file manager within the scope of recognizing the connection of standard mass memories for managing transfers of contents between different appliances possibly including non-voice attached files, not utilized with the scope of the system according to the invention. A removable memory card reader in a standard format is comprised in said voice portion if need be as a complement or replacement of a port for allowing exchanges of files with external equipment. In an even more sophisticated alternative, the system according to the invention is connected to at least one external network, directly by internal connection means, or via a gateway providing the Internet connection to which the system according to the invention may advantageously be connected by transmission means, such as WiFi or Bluetooth or their successors. Thus, it is possible to use the voice portion of the system according to the invention as a messaging centre interoperating with most of the communicating portable and stationary appliances and with open or specific services of telecom operators. In certain alternatives, it is provided that said voice functions of the system according to the invention further comprise the functions of a conventional telephone micro-switch or using IP voice techniques. The function of a basic telephone answering/recording machine is of course supported but a number of subsidiary functions are possible within the scope of the system. Thus, the presence of a given portable telephone may be identified by the device according to the invention which may transmit this utilizable information within the scope of sophisticated telecom services, advantageously multimodal services, for example comprising dynamic re-routing of telephone communications, updating of information in social networks to which the relevant user has subscribed on Internet, etc. Furthermore, provision is made for loading onboard a web micro-server in said voice portion of the system in order to notably facilitate configuration of the system by means of a standard web navigator which may be executed on any portable or stationary appliance either locally or remotely connectible.

The invention provides that the system further comprises means for automatically recognizing the addressee of a voice message during the charging of the portable appliance which is associated with him/her, the charging of the portable appliance further causing automatic reading of at least one voice message recorded beforehand intended for the recognized addressee.

In a particularly preferred embodiment, the system according to the invention further comprises means for automatically recognizing the portable appliance during its charging. By a prior configuration step allowing the system to subsequently associate the portable appliance and its user, the means for recognizing the portable appliance will allow automatic recognition of the user associated with the portable appliance. The information relating to the association is stored in a non-volatile memory comprised in the system during the configuration step. All the means allowing the portable appliance to be recognized during its charging enter the scope of the invention. This may for example be a transponder integral with the portable appliance and which transmits a unique identification number without any contacts to the suitable reader comprised in the system, this may for example also be reading and recognizing parameters obtained by a data exchange with the portable appliance.

The invention provides that the device further comprises means for disconnecting at least one power supply used for recharging said at least one portable appliance when said at least one portable appliance in connection with said at least one relevant power supply is not being charged or when its recharging is considered as having ended.

Here, discontinuity in providing the recharging voltage to said at least one portable appliance is dealt with in said device according to the invention. It is based on switching means with which transmission of electric energy provided by the external and/or internal source, if need be, to the charging means may be controlled. According to alternative embodiments, the control may be globally processed for all the charging means or differentiated depending on the relevant charging means; for example, depending on whether these are an internal power supply source for recharging portable appliances or chargers external to the device. In other alternative embodiments, the differentiation in the control of energy transmission is accomplished by the portable appliance or by a group of portable appliances. In the most preferred embodiment, the discontinuity is handled globally by disconnecting the energy source which in the majority of the cases is the low voltage electric mains of a building. In this type of application, only a first internal power supply remains under permanent voltage, which advantageously has the technical characteristics of very low active consumption in a standby mode, of large robustness towards perturbations which may affect the external energy source and a long lifetime when permanently powered. An embodiment pressing these advantages to the utmost degree is based on entirely disconnecting the external energy source by a relay further providing the maintaining of the power supply during charging. This embodiment requires a starting command which is materialized by the brief closure of a contact mounted in parallel on that or those of the relay in order to start the recharging process. The circuit for controlling the relay ensures handling of the maintaining of the power supply during charging and automatic disconnection when the conditions are met.

The invention provides that the device further comprises an additional time-lag for maintaining the charging which postpones the instant of effective disconnection from the instant of detection of the conditions for disconnection.

It is provided that an additional time-lag for maintaining charging is added between the instant of detection of downward crossing of the power threshold corresponding to portable appliances considered as all charged or not being charged and the instant of opening the contact of the relay leading to disconnection of the internal power supply and of possible external chargers from the external power supply source. With this time-lag it is notably possible to compensate in certain cases the lack of being able to measure the power consumed by the portable appliances at the end of charging in that this ensures maintaining the powering of the chargers until recharging is undoubtedly finished.

The invention provides that the device automatically disconnects said at least one power supply used for recharging said at least one portable appliance when the power consumed by the corresponding load exceeds a threshold determined beforehand.

The invention provides that application of a capability of disconnecting loads in the device as well as of means for measuring a quantity representative of the power is advantageously completed by comparison with a determined threshold which, in the case of it being exceeded, causes disconnection of said loads. The device is thus protected against the consequences of any dysfunction of the loads which are external to it such as for example a short-circuit in an external charger, in a battery or in a portable appliance. This protection mode further reduces the likelihood that a fault in a component external to the device causes a fire, in that the amount of dissipated energy in the faulty component is limited.

It is also provided that said device further comprises means for recharging said at least one portable appliance by receiving a command and/or by automatic detection of the charging of said at least one portable appliance.

It is provided that a command from the user is required in the most economical alternative embodiments of the invention nevertheless providing most of the aforementioned advantages.

In more elaborate alternatives, means are provided for detecting the arrival of a portable appliance in a position to be recharged in order to automatically start the recharging process. Many solutions exist in order to do this, for example by means of a contact on the appliance support, by an optical, Hall effect magnetic sensor or by a reed relay contact, by detection of the presence of a load in the recharging circuit, etc.

The invention provides that said device further comprises means for automating periodical recharging of at least one portable appliance.

The invention provides that within the scope of certain embodiments, the control means comprised in the device automatically start the recharging process periodically in order to maintain the charged condition of the appliances. In particularly sophisticated embodiments of the invention, provision is made for making this functionality configurable and/or self-adaptive as regards the periodicity of the automatic restarts.

It is also provided that said device further comprises means for recharging at least one electric energy accumulator as such and/or at least one simple portable appliance comprising an electric energy accumulator and not comprising a charging supervisor.

The alternative embodiments of the invention for recharging a plurality of portable appliances provided for home use are advantageously completed by a capability of recharging batteries in the most current formats via if necessary optional adapters and/or simple portable appliances such as for example a torch, the light source of which consists of one or more LEDs. Such a lamp may still more advantageously be associated with the system according to the invention on a suitable support with which it may be easily gripped and its charge may be sustained by periodical recharges.

The invention provides that said device further comprises means for ensuring at least one accelerated recharging mode.

The invention intends to provide at least one accelerated recharging mode for electric energy accumulators and simple portable appliances comprising an electric energy accumulator and not comprising any recharging supervisor. For these appliances, a recharging algorithm and/or a recharging current level above the rated values for the relevant type of accumulator are applied in the device. Rapidity of charging is preferred over the lifetime of the accumulators in an accelerated mode. An accelerated mode is also provided for the other portable appliances comprising a recharging supervisor which supports such a mode. Indeed, for this category of appliances, it is the appliance itself which determines the demanded current. Thus, it is provided that the device is able to provide a charging current above the rated one and signals to the portable appliance that an accelerated recharging mode is selected so that the latter demands a charging current above the rated value. As the signaling modes are not standardized, suitable configuration capabilities are provided in the invention in order to adapt the behaviour of all or part of the system according to the invention to the particularities of the portable appliances to be recharged.

It is also provided that said device further comprises means for connecting to an external electric energy source, these means comprising a cable equipped with at least one suitable connector made by overmoulding.

The invention provides that the device according to the invention may be connected to an external energy source. In the most common cases of applying the invention, this means connection to the home electric mains, for example to a low voltage 230V/50 Hz or 110V/60 Hz network. In certain embodiments of the invention more particularly adapted to vehicle use, the device according to the invention is connected to an external DC current source with very low voltage for example a 12V or 48V source suitable for use in automobiles, motor homes, trucks, buses, boats, etc. Connection to external DC current sources such as a solar panel, and connection to an alternating current (AC) source for the use of the invention in collective transportation means such as trains, aircrafts or boats are also provided. In certain embodiments of the invention, connection to several types of external electric energy sources is provided, for example a means for connecting to a very low DC voltage network and a means for connecting to a low AC voltage network are provided. Connection to a photovoltaic solar panel as an external energy source is also provided.

The invention provides that said device further comprises a self-contained energy source.

The invention provides that the device according to the invention may be connected to an internal energy source. In the most common cases of application of the invention, this is a primary accumulator comprised in the device. This accumulator after a recharging phase requiring the connection of the device to an external electric energy source, to a low AC voltage network or to a very low DC voltage network, provides the possibility of recharging in a fully self-contained way one or more portable appliances a number of times determined by the capacity of said primary accumulator and its charge condition. The presence of an accumulator in the device is particularly suitable in the alternatives of the invention applying a photovoltaic solar panel as an external energy source.

It is provided in the invention that said device further comprises a single very low voltage power supply source capable of recharging at least one portable appliance, the voltage of this single source being stabilized to a value making it suitable for directly recharging at least one portable appliance version.

The invention provides that the device comprises a single very low voltage power supply source capable of recharging at least one portable appliance. The voltage of this single power supply source being stabilized to a value, for example of 5V, making it suitable for recharging at least one portable appliance version. Although several values of very low DC voltage may suit the stated technical criteria, for example values comprised between 3.6V and 14.4V, for which portable appliances to be recharged are currently found in the field of various electronic and electro-portable appliances, the value of 5V is optimum in that it corresponds to the recharging voltage undergoing standardization for portable electronic appliances and that it is easy to derive from the latter lower voltage values if necessary by means applied in said adapter. In certain embodiments of the invention, the galvanic insulation required for electric safety of the system is achieved at the level of said single very low voltage power supply source.

It should be noted that there is no departure from the scope of the invention, if the device comprises several single very low voltage power supply sources capable of recharging at least one portable appliance. In this case, the uniqueness of the very low voltage source has to be understood relatively to the fact that it is capable of recharging several portable appliances. Thus, the device may for example comprise a first single voltage source stabilized to 5 volts and a second one stabilized to 14.4V for covering a wider spectrum of portable appliances with a single device according to the invention. In certain alternative embodiments, the polarity of the charging current cannot be guaranteed by the design of the mechanism and/or the layout of the contacts. In these alternatives, a diode protecting against polarity inversion or further diodes mounted as a rectified bridge for ensuring recharging regardless of the polarity of the provided current, are added into said at least one adapter according to the invention. The presence of diodes in series in the charging circuit has to be compensated upstream by raising the voltage provided by said single very low voltage power supply source. By raising the voltage of the source by a value corresponding to the voltage drop of the diodes it is possible to supply the relevant portable appliance with the suitable rated charging voltage.

The invention provides that the device blocks the power supply of all or part of said at least one portable appliance in order to remain within the limits of the capabilities of said single very low voltage power supply source in the case of power needs above the capacities of said single very low voltage power supply source.

The invention provides that the device is aware of the power actually demanded or likely to be demanded by the whole of the loads represented by said at least one portable appliance to be recharged. It is provided that the power may be known by any means such as for example by measuring the current actually consumed by each portable appliance, by measuring the current demanded by the whole of said at least one portable appliance at the output or at the input of said single power supply, by detecting the presence of a portable appliance and by associating the rated recharging power which it requires or if necessary the power required for accelerated recharging. It is provided that if the downstream demand for power exceeds the power which may be provided by said single upstream power supply, the device blocks provision of power for powering all or part of said at least one portable appliance in order to remain within the limits of the power which may be provided by said single power supply. Advantageously, as soon as power is released consecutively to the end of the recharging or upon disconnecting an appliance, the device unblocks the provision of power for powering all or part of said at least one portable appliance put on hold beforehand within the limit of the available capacities. In a particularly elaborate alternative of the invention, the rules for handling priorities among the appliances and if necessary for handling options of accelerated recharges relative to the use of the available output power are adjustable and/or configurable.

The invention further provides that the device enters in a mode for sequentially recharging all or part of said at least one portable appliance when the power needs exceed the limits of the capabilities of said single very low voltage power supply source.

In a particularly preferred alternative embodiment of the invention which is normally capable of recharging portable appliances simultaneously, it is provided that, if the power demanded by the whole of said at least one portable appliance exceeds the capabilities of said single power supply, the device then manages to provide power to at least one portable appliance and to at least one group of portable appliances in a sequential way. By sequential recharging mode is meant any charging management method which takes time into account. Thus for example, the device may simultaneously recharge all the portable appliances which are connected to it until it reaches the maximum capability of said single power supply and then puts on hold the other possible portable appliances which cannot be recharged simultaneously. In this example, as soon as a portable appliance has been recharged, its powering is interrupted because of the recharging supervisor comprised in the actual portable appliance or because of a means specific to the system according to the invention. Thus at least one of the portable appliances having been placed on hold may have the released power allocated to it and be automatically placed in effective recharging. For example, it is also possible to distribute over time the available power by allocating recharging periods of a determined duration to each appliance in a rotating handling process which continuously maintains the total power actually demanded by said at least one portable appliance to a value of less than or equal to the maximum capability of said single power supply. Other algorithms for allocating the resources of said single power supply are possible without departing from the scope of the invention. In a particularly elaborate alternative of the invention, the rules for handling time-dependent recharging are adjustable and/or configurable.

The invention provides that the device is able to detect at least one effect of an intervention of the user in the system or in its close environment, and that the device is able to automatically change its functional state accordingly.

Notably, in the case of an interruptible power supply, of a multiple power supply or of a power supply with several functional states, such as several power stages, the change in the functional state of the device may occur automatically by detecting at least one effect of an intervention of the user in the environment of the system. By intervention of the user in the environment of the system is meant the detection of any detectable change consecutive to direct or indirect action of the user in connection with one of the portions of the system according to the invention. This may for example be the occurrence of a situation suitable for recharging a portable appliance, a detection of contact or proximity of at least one portion of the body of the user. The following non-limiting examples illustrate the variety of technical solutions which may be applied within the scope of the invention: detection of the electric connection of a portable appliance, detection of the presence of a load in the energy transfer circuit, detection of the laying-down of a portable appliance on a support, detection of proximity of the user by passive or active infrared means, by change in frequency of a free oscillator. This may also be the contact of a portion of the body of the user by utilizing its conductivity within the scope of a ground connection or the upward crossing of a reception threshold of a signal relating to the frequency of the mains when the user touches a conducting portion in connection with the device, this conducting portion may be a metal or metallized area integral with the device, of said at least one adapter or further of the appliance to be recharged. The detections of several effects may advantageously be combined, in particular in the case of the use of indirect effects or of those which are known as being likely to be not very reliable in order to reduce the probability of erroneous detection.

It is provided that said at least one adapter of the system according to the invention comprises at least one first sub-assembly connected to the device, said first sub-assembly being capable of transferring electric energy to a portable appliance by wire means comprising at least two contacts and/or by non-wire means comprising at least one primary inductor, the energy transfer occurring directly or via a second sub-assembly connected to said at least one portable appliance, the second sub-assembly comprising at least two contacts and/or at least one secondary inductor.

It is provided that said at least one adapter according to the invention may assume several forms such as a cable terminated by at least one connector or at least one inductor allowing direct recharging of at least one portable appliance. It is also provided that said at least one adapter is subdivided into two sub-assemblies generating a new interface between them. It is further provided that several different forms of adapters are applied in a same system according to the invention. In the language of the invention, the first sub-assembly of said at least one adapter is the one which has an interface with said device and the second sub-assembly is the one which has an interface with the portable appliance. The invention provides that according to its alternative embodiments, all the combinations of the first and second sub-assemblies are possible; this from a single first assembly potentially associable with an infinity of second sub-assemblies in order to meet the adaptation needs of present and future appliances right up to several first sub-assemblies potentially associable with a single version of second sub-assemblies as well as all the intermediate combinations of the first and second sub-assemblies. It is provided that the non-wire means only comprise a primary inductor, i.e. an energy transmitter in the case of recharging said at least one portable appliance originally comprising a secondary inductor, i.e. an energy receiver. In this case, the single inductor is reputed to belong to said first assembly in the sense of the invention.

It is provided that first and second sub-assemblies of said at least one adapter of the system according to the invention are laid out in order to materialize an interface between them which is capable of transferring electric energy and which is at least partly independent of the specific characteristics of said at least one portable appliance.

Within the scope of a particularly preferred embodiment of the invention, it is provided that the new interface resulting from the sub-division of said at least one adapter is standardized in order to be common to a plurality of portable appliances. Indeed, the large variety of types of connectors used for recharging portable appliances, the existence of several voltages, the variety in the localization of the connectors, the variety in the dimensional characteristics of the appliances makes it advantageous to generate a new standardized interface for connecting a plurality of heterogeneous portable appliances to a universal device according to the invention. Moreover, it is provided that the new interface is at least partly or even in certain cases, completely independent of the specific characteristics of said at least one portable appliance.

The invention also provides that the contacts and/or inductors which have to cooperate are respectively maintained in a contact and/or coupling position suitable for transfer of electric energy by the effect of a force.

It is provided that the invention is applied starting with contacts included in standard connectors or specific to said at least one portable appliance. The use as a second inductor receiving electric energy, of an inductor originally comprised in a portable appliance if necessary is also provided.

In a preferred alternative of the invention, it is also provided that the interface between said first and second sub-assemblies consists in at least two pairs of electric contacts establishing the continuity of at least two electric connections in the position for recharging the portable appliance.

In a still more preferred alternative, the energy transfer is achieved by inductive coupling. Said at least one pair of inductors if necessary completed by keepers forming a magnetic circuit in order to improve the efficiency of the coupling, should be maintained in a position allowing sufficient coupling in order to ensure energy transfer during the recharging of the portable appliance.

It is further provided that the contacts and/or inductors which have to cooperate are respectively maintained in a contact and/or coupling position suitable for transferring electric energy by the effect of a force being exerted on the portable appliance and/or on the second sub-assembly of the adapter if necessary.

By the effect of a force is for example meant the effect of the force of gravity on the masses of the portable appliance and of the second sub-assembly and/or the effect of at least one force exerted by at least one spring or one spring-forming material and/or the effect of the magnetic attraction force between at least one magnet or an electromagnet comprised in a sub-assembly and a ferromagnetic portion or another magnet having opposite polarity comprised in the other sub-assembly.

It is provided in the invention that concerning said adapter, the maintaining of said second sub-assembly or of the portable appliance exerted by a force is controlled by an electric control relating to the state of the charge of the portable appliance.

This is a refinement of the invention for automatically disconnecting and/or automatically placing the portable appliance in a position allowing it to be more easily gripped at the end of charging, for example if the appliance is maintained by the effect of a magnetic force produced by at least one permanent magnet. This may also be the maintaining of the portable appliance in the charging position by the flow of the charging current in a coil, the appliance being able to exit this position, for example by the effect of a force exerted by a spring when the charging current passes below the maintaining threshold.

The invention provides that, concerning said adapter, said second sub-assembly is associated with means achieving at least partial overcladding of the portable appliance.

The invention provides in a particularly preferred alternative embodiment that overcladding means such as those which are currently proposed for protecting portable electronic appliances, further comprise technical means for materializing a second sub-assembly of said at least one adapter according to the invention. It is thus possible to standardize by means forming one body with the actual portable appliance, all or part of its specific characteristics, notably but not only, those of which relate to its recharging.

The invention also provides that, concerning said adapter, the connector providing the connection of the electric circuits of said second sub-assembly with the portable appliance has a reduced protruding portion relatively to the corresponding standard connector when the connector is inserted in the corresponding base of the portable appliance.

It is further provided in the invention that the connector which has to power the portable appliance, at least for its recharging, has a protruding portion of reduced or even zero size when the connector is inserted into the corresponding base of the portable appliance. This arrangement is particularly advantageous in order to maximally refine the overcladding when the base of the relevant recharging connector is not located on the side where an overthickness is provided for example for housing therein the required additional components. Means such as a slot or a bore in the accessible portion of the connector are sufficient for being able to extract the connector if required by means of basic tooling such as a small screwdriver or an unfolded paper clip. Provision is also made for extracting the connector from its base by exerting traction on the electric connection means which are integral therewith even if this operation is destructive.

It is provided in the invention that the second sub-assembly of said adapter further comprises means for restoring at least one original resource of the portable appliance.

By restoration of at least one original resource of the portable appliance via means achieving at least partial overcladding of the portable appliance, is meant for example the restoration of the function of at least one indicator and/or at least one button and/or at least one hole and/or at least one original connector and/or geometrical characteristics identical with those of at least one portion of the portable appliance.

It is also provided in the invention that said second sub-assembly of said adapter comprises at least one additional resource relatively to those of the relevant portable appliance and/or at least one standard resource functionally equivalent to at least one specific resource of the relevant portable appliance.

This is provided via means achieving at least partial overcladding of the portable appliance, at least one indicator and/or at least one button and/or at least one hole, and/or at least one connector which does not exist or which exists differently in the relevant portable appliance. This may be at least one connector not provided within the scope of the relevant portable appliance and/or at least one standard version of a connector existing in a specific form in the relevant portable appliance. For example, many designs of portable telephones propose a single multifunctional connector specific at to its format and to its wiring in order to connect external, in fact specific, accessories by the need for a mating connector. These may be earphones, a connecting cord to the USB port of a microcomputer, a specific charger, etc. The means according to the invention achieve at least partial overcladding of the portable appliance and further give the possibility of providing additional connectors and/or standard connectors which are advantageous for the user in that he/she may thus connect standard accessories which are more easily available and which may be selected in a more extensive offer generally comprising less costly versions and/or more qualitative versions than the original accessories. The use of standard accessories further provides the additional advantage of their being able to be shared with other portable appliances. Said additional resources may also for example be a charging indicator such as a LED, in order to signal without any ambiguity and instantaneously the effectiveness of the charging and for indirectly validating proper positioning of the second sub-assembly and proper operation of the device and of the first sub-assembly.

It is further provided in the invention that said second sub-assembly of said adapter comprises at least one contactless identification means.

Said second sub-assembly is closely associated in a way which may be considered as permanent, with the portable appliance which it overclads at least partly, the latter being further associated with its user, in particular if this is a portable telephone. The invention provides the use of these durable associations by integrating into said second sub-assembly of the adapter, at least one contactless identification means. For example, this is at least one transponder operating only in a reading or in a reading and writing mode, operating by inductive, capacitive or radiofrequency coupling, so-called RFID coupling in order to allow identification of the portable terminal and/or of its user by means of data readout and processing devices which may be external to the invention. Said at least one contactless identification means may be removable and placed in an accessible housing of said second sub-assembly, for example comprised in a recess closed by a wall of the portable appliance when the latter is overclad. In a preferred alternative, notably for safety applications external to the invention, said at least one contactless identification means is at least partly overmoulded in a wall of said second sub-assembly of the adapter. It is provided that said at least one contactless identification means is used for recognizing the addressee of a voice message according to the invention as described earlier. It should be noted that the contactless identification means further allow significant improvement in the confidentiality in handling voice messages which thus can only be listened to by the identified wearer of the means.

It is also provided that said at least one identification means is used associated with a parameterization of at least one technical characteristic for example relating to the recharging and which requires the recognition of a given portable appliance by the device. Furthermore it is provided that said at least one contactless identification means comprised in the second sub-assembly according to the invention, is used within the scope of external applications such as in the following non-limiting examples: for opening the electronically controlled lock of a door of a building or of an motor vehicle, for paying access to public transportation, for time-punching, etc. For avoidance of doubt, we stay in the scope of the invention if a cryptoprocessor is included in the said contactless identification means for improving security in the frame of applications like payment, authentication . . . . The plurality of distinct contactless identification means in a same second sub-assembly according to the invention is often practically required for reasons of security, confidentiality or for different technical standards imposed by the operators of the services. It is particularly advantageous for the whole of the interested parties in dealing with the contactless identification problems within the scope of a second sub-assembly according to the invention rather than directly in the portable appliance which is associated with it.

The invention provides that the adapter for connecting said device to said at least one portable appliance comprises at least one cable and at least one connector made by overmoulding, said at least one connector being suitable for recharging at least one portable appliance version.

In the involved alternative embodiments of the invention, the adapter may be the original mains adapter provided for recharging a given portable appliance version, the device according to the invention ensuring the handling of the power supply of said at least one relevant mains adapter. In other alternatives which may be applied alone or combined with the previous one, said at least one portable appliance is powered for recharging it directly from the device according to the invention which then comprises at least one suitable very low voltage power supply. It is further provided that the gripping portion of said at least one connector is made by overmoulding plastic material around the incoming cable and the technical portion of the actual connector, the suitable contacts of which have been connected beforehand to the corresponding wires of the cable. It is also provided that the standard of the retained connector for fitting out the end of the cable non-connected to the device, is suitable for recharging at least one portable appliance version. It is understood that the suitability of the retained connector for recharging at least one portable appliance version is obtained by direct connection or via a second sub-assembly according to the invention forming at least partial overcladding of the portable appliance. The two preferred connector standards within the scope of the invention are the so-called universal standard or further <<micro-USB>> standard or <<mini-USB>> standard, both connector standards further providing the benefit of standardization of the associated voltage supply (5V DC). Of course, the use of any other present or future standard suitable for recharging at least one portable appliance version remains within the scope of the invention.

The invention also provides that the adapter further comprises a removable device for changing the connector type, and made by overmoulding, in order to allow the connection of a portable appliance, the recharging connector of which is not compatible with said at least one connector of the adapter.

This is the possibility of recharging with the system according to the invention portable appliances which are not equipped with a connector compatible with the one retained for the end of the cable of the adapter according to the invention. The device for changing connector type according to the invention comprises a base compatible with the connector retained for the end of the cable of the adapter and a connector compatible with another standard.

The invention within the scope of the adapter provides that at least one of the parts made by overmoulding further comprises one or more diodes mounted in series, in at least one of the power supply circuits, in order to lower the voltage provided by the device to a determined value which is suitable for recharging the relevant portable appliance version.

This is the possibility of recharging, with the system according to the invention, portable appliances for which the voltage supply for recharging is lower than that provided by the retained connector for the end of the cable of the adapter according to the invention. The intention is to use the voltage drop at the terminals of a diode which is a characteristic which is relatively independent of the current flowing through it, in order to be able to produce an inexpensive, not very bulky voltage step-down device and which is further easily integrable into a component made by overmoulding without requiring any printed circuit. By selecting diodes in suitable categories, the intention is to be able to determine the output voltage of the step-down device in a relatively fine way from a known input voltage. For example, by using conventional silicon diodes mounted in series, the input voltage is lowered by 0.6V per diode. By including so-called Schottky diodes in the series circuit, it is possible to finely adjust the output voltage by a drop of 0.2V per diode. In practice, it is sufficient to use 1 A silicon diodes of general use, for example from the <<1N4000>> series which are particularly economical and robust in order to obtain an output voltage which is comprised within the tolerance of the portable appliance to be powered. The diode step-down voltage device according to the invention may be comprised in an overmoulded connector type converter as described earlier or further in the overmoulding of a connector fitting out the end of a connecting cable between the device and a portable appliance.

DETAILED DESCRIPTION OF THE FIGURES AND OF EMBODIMENTS

Other particularities and advantages of the invention will further appear in the description hereafter. In the appended drawings given as non-limiting examples: FIG. 1 illustrates the architecture of the system according to the invention in its environment.

An external electric energy source (2) and an internal source (3) comprised in the device (4) provides the energy required for recharging said at least one portable appliance (5) and for the internal needs of the system according to the invention (1). Said at least one adapter (6) ensures energy transfer from the device (4) to said at least one portable appliance (5).

Figure 2:
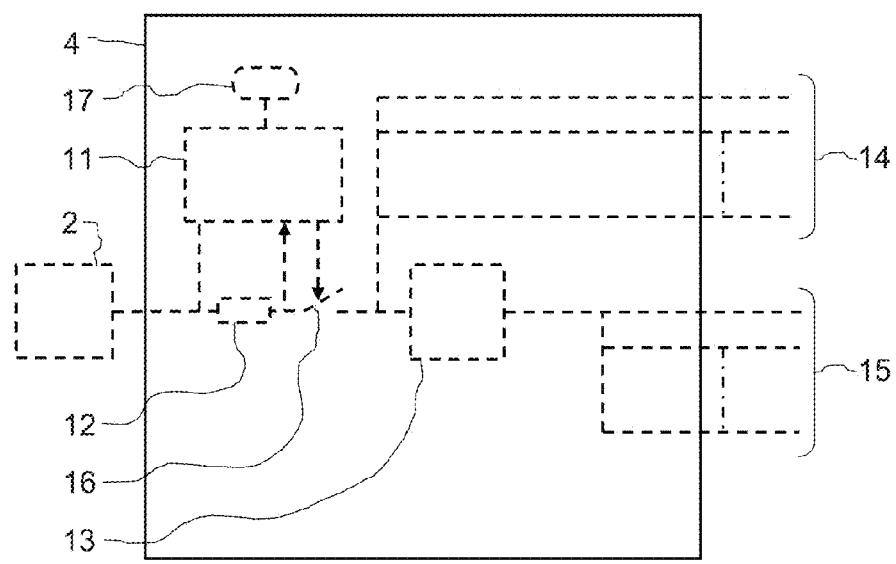
FIG. 2 illustrates the internal structure of the preferred alternative of the device.

An adapter (7) comprises at least one first sub-assembly (8) connected to the device (4) in order to directly transmit electric energy to said at least one portable appliance (5) or in certain alternative embodiments via the second sub-assembly (9). In the relevant alternative embodiments, a new interface (10), which is at least partly independent of the specific characteristics of said at least one portable appliance (5) is materialized between said first and second sub-assemblies (8, 9). FIG. 2 illustrates the internal structure of the preferred alternative of the device. This alternative is preferred because it is both robust, industrially applicable at low cost and is more universal with regard to appliances which may recharged, in that it manages an internal power supply for recharging current portable appliances, but also any other type of external charger for recharging portable appliances for which the solutions for current portable appliances are not suitable. The structure disclosed in FIG. 2 corresponds to the illustrations of FIGS. 6-8.

In this exemplary embodiment of the invention which is in no way limiting, a circuit (11) for controlling the device (4) is powered by an external electric energy source (2) which in this example is the low AC voltage 230V/50 Hz or 110V/60 Hz electrical mains. The control circuit (11) comprises means for ensuring its own power supply from the external source (2). These means are provided for having a long lifetime of the permanent power supply, large robustness and an active power consumption of less than 0.5 W in a stand-by mode. A power supply circuit comprising a capacitor as a series voltage step-down component, is particularly suitable for providing these characteristics. Said control circuit further comprises means (12) for measuring the power consumed by the whole of the loads (13, 14) which are connected to it. The relevant loads comprise the external loads which may be connected on the controlled mains outlets (14) provided for this purpose as well as on the internal power supply of a device (13) which is provided for directly powering portable appliances with view to recharging them by means (15). The internal power supply (13) is further provided in order to ensure the galvanic insulation required for the electrical safety of the system according to the invention. Said internal power supply (13) however does not need to have exceptional characteristics as regards its operating lifetime and no-load yield because its power supply is interrupted by a relay (16) comprised in the control circuit when all the portable appliances are disconnected or when their recharging is considered as having ended. The control circuit (11) further comprises an interface with the user (17) which may only consist of a starting push-button and an indicator signaling the functional state of the device. The control circuit (11) also comprises the logic for handling the resources comprised in the device (4) as well as means for adjusting the power threshold below which the portable appliances are considered as having been charged or not being charged. The threshold if necessary takes into account the residual power consumed by possible external chargers which remain connected and are seen as permanent loads by the measuring means of the control circuit (11). The means for measuring the power consumed by the chargers (13, 14) may advantageously only be current measurement means. Considering the relatively low power of the loads represented by the chargers, measuring the voltage on the terminals of a low value resistor, for example 0.47 Ohm which may dissipate a few Watts, is suitable for applying the invention although any other technique with which a quantity representative of the power consumed by the chargers may be measured or evaluated, enters the scope of the invention. It is further provided that an additional charging time-lag is added between the instant of detection of downward crossing of the power threshold corresponding to portable appliances considered to be all charged or not being charged and the instant of the opening of the contact of the relay leading to disconnection of the internal power supply (13) and of possible external chargers (14) of the external power supply source (2). With this time-lag, it is notably possible to compensate in certain cases the lack of the possibility of measuring the power consumed by the portable appliances at the end of charging, in that it ensures the maintaining of the power supply of the chargers until recharging is undoubtedly finished.

The whole of the means applied for handling the device may be comprised in a standard low cost microcontroller such as for example in an <<ATtiny25>> from <<Atmel>> (registered trade marks) equipped with the suitable microprogram. The control circuit may also be made from wired analog and/or logic electronic means without departing from the scope of the invention. Further, optional means are advantageously provided with which the operating parameters of the system according to the invention may be adjusted and/or configured, including the duration of said additional charging time-lag. It should be noted that finer handling of the state of the loads may be obtained by measuring the current not globally for the whole of the loads but in a more individualized way up to one current measurement per load. A first improvement stage which however remains within reasonable application costs, consists of using first means for measuring the current consumed by the whole of the loads operating at the mains voltage and second means for measuring the current consumed by the internal very low voltage power supply source at its primary, the consumption of the power supply source at its primary being directly related to the consumption of the loads supplied with a very low voltage, connected to its secondary.

Figure 3:
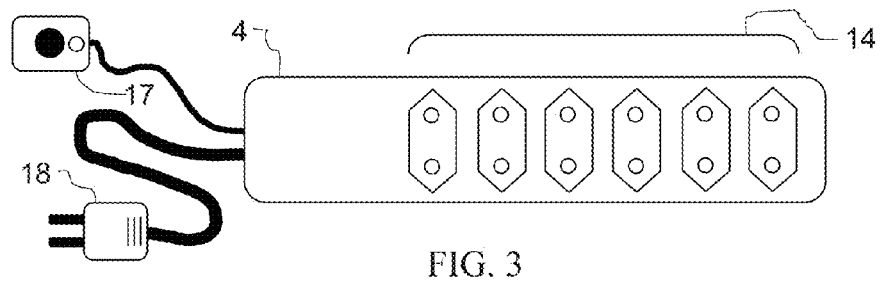
FIG. 3 illustrates a first alternative of the invention.

FIG. 3 illustrates a first alternative of the invention.

This is an application of the invention arranged for controlling the electric power supply of at least one individual charger per portable appliance. In this alternative, the device (4) according to the invention assumes the form of a block of electric sockets (14) intended for receiving at least one individual charger such as those usually shipped with the appliances or commonly available as an accessory. Said at least one individual charger represents said at least one adapter in the sense of the invention. Remote interaction means with the user (17) which for example comprise a starting push-button and an indicator allowing minimization of the visible portion of the system according to the invention. The device further comprises at least one means for switching the power supply of the individual chargers from a common connection (18) to the electric network. Means are provided for measuring or for evaluating the power consumed by said individual chargers, on a unitary basis with one detection per provided socket or on a global basis, or further on a basis per group of plurality of sockets. Measurement or evaluation of the power consumed by the external charger may only be based on a current measurement, for example by means of a resistor or of the primary of a current transformer in series with the circuit for powering the external charger. Taking into account the relatively low power of said external chargers, the current of which is to measured, measurement cells comprising a relatively high value resistor and two power diodes mounted anti-parallel may provide a signal of relatively strong amplitude capable of being measured by means of a analog/digital converter comprised in a standard microcontroller. The value of the measurement resistor is calculated so that the range of interest is comprised in the voltage excursion linear area before clipping performed by the diodes. Grouping several sockets for individual chargers behind a common measurement cell with view to lowering application costs is possible without departing from the scope of the invention, the limit being the capability of discriminating the consumption of an active charger relatively to the sum of the residual consumptions of a plurality of connected chargers under no load or the appliance of which is connected but has ended its recharging. In the case of the use of a current transformer, grouping measurement means may be accomplished by laying out a plurality of sockets connected in parallel behind a single primary winding of the current transformer. Advantageously, the spacing of the sockets intended to receive individual chargers may be non-uniform and/or spatially oriented in order to allow the connection of one or more chargers with significant bulkiness without however significantly increasing the size of the device.

From the measurement or the evaluation of the power or current consumed by the external chargers, and from a comparison with at least one value determined beforehand, the device according to the invention will cut off the electric power supply of all the chargers when no appliance will be charging anymore. The setting of said at least one value determined beforehand may be accomplished in the factory, by prior learning and storing the corresponding consumption at the end of charging. Detection of the end of charging may also be accomplished by means of an algorithm utilizing the value of the measurement and the dynamics of its change. In a particularly economical alternative, provision is made by the invention for only handling the starting times of the chargers without taking into account the power or the current consumed by the latter. A time-lag with a longer duration than the longest of the normal recharging durations which is restarted at each new recharging of a portable appliance is provided which cuts off the power supply of the chargers upon arriving at its time-out. Advantageously, beyond the default adjustments made in the factory which are suited to most cases of use, adjustment and/or configuration means are applied in the device in order to be able to nevertheless use the system in particular cases.

Figure 4:
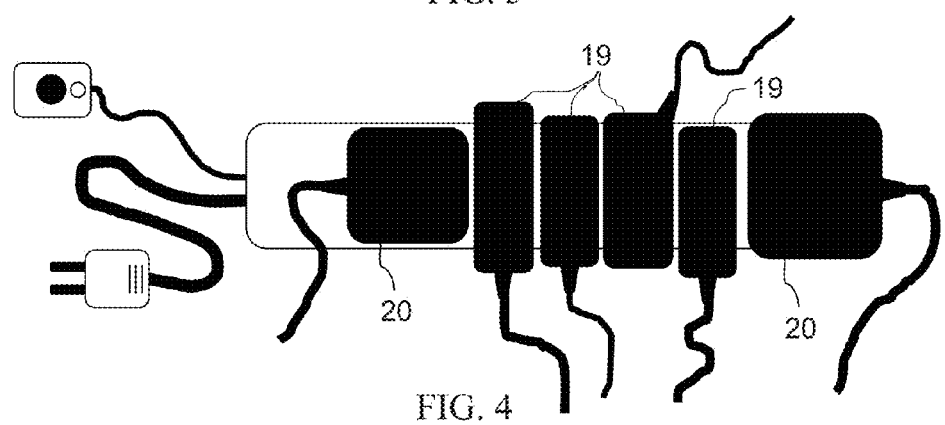
FIG. 4 illustrates the first alternative with connected adapters.

FIG. 4 illustrates the first alternative with connected adapters.

It should be noted that the proposed distribution of the sockets in this example is optimized for low power switching chargers (19) but it nevertheless allows connection of bulky chargers (20) at both ends without giving up the compactness of the device.

Figure 5:
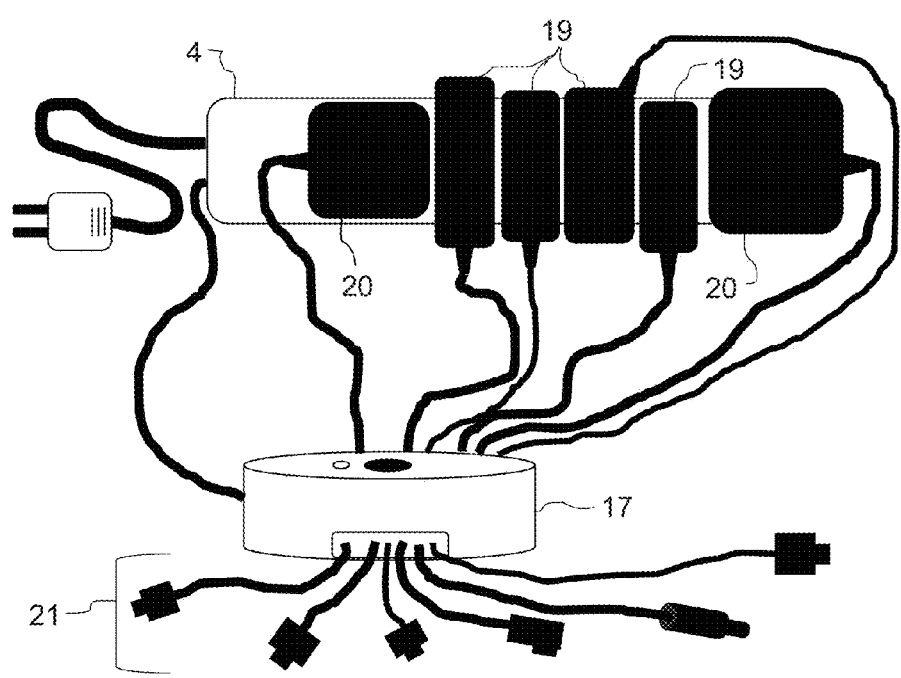
FIG. 5 illustrates the first alternative in another style.

FIG. 5 illustrates the first alternative in another style.

In this example, the remote control for starting the system according to the invention of the previous alternative also fulfils the function of keeping available connectors ready to be grasped in order to connect them onto the corresponding portable appliances. This exemplary embodiment provides the separation between the unsightly portion of the system comprising the device (4) and the body of the external chargers (19, 20) on the one hand, and the means for interacting the user (17) and the ends of the cables from the individual chargers (21) on the other hand, which should remain easily accessible. Thus, the device and the power supplies may remain hidden, for example on the floor behind a piece of furniture and the remote control may advantageously be set up on the top of a piece of furniture at the location where the portable appliances will be laid in order to recharge them.

Figure 6:
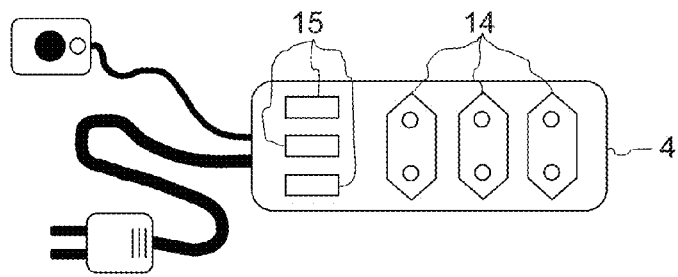
FIG. 6 illustrates the preferred alternative of the invention.

FIG. 6 illustrates the preferred alternative of the invention.

This alternative differs from those of the FIGS. 3, 4 and 5 by the fact that the device (4) according to the invention further comprises a very low DC voltage power supply, for example delivering a voltage of 5V and capable of providing a current of at least 2 A for example via USB standard sockets (15) in order to directly recharge portable appliances in addition to means for controlling the low AC voltage power supply of the external chargers, for example as 230V/50 Hz or as 110V/60 Hz via a plurality of sockets (14).

Figure 7:
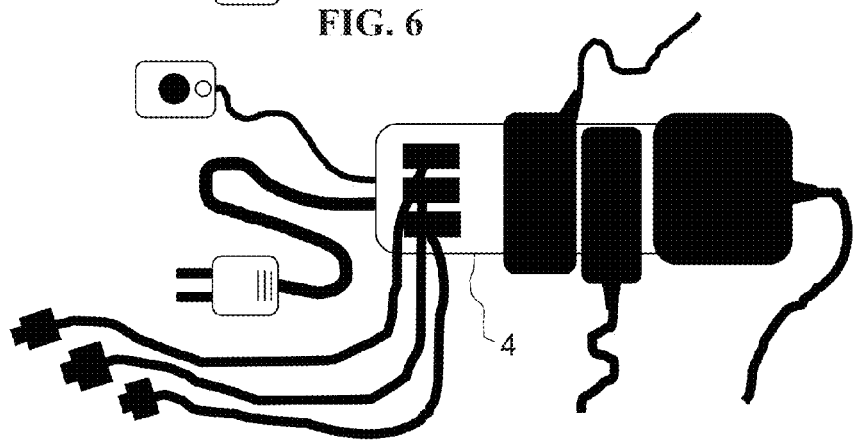
FIG. 7 illustrates the preferred alternative with connected adapters.

FIG. 7 illustrates the preferred alternative with the connected adapters.

Figure 8:
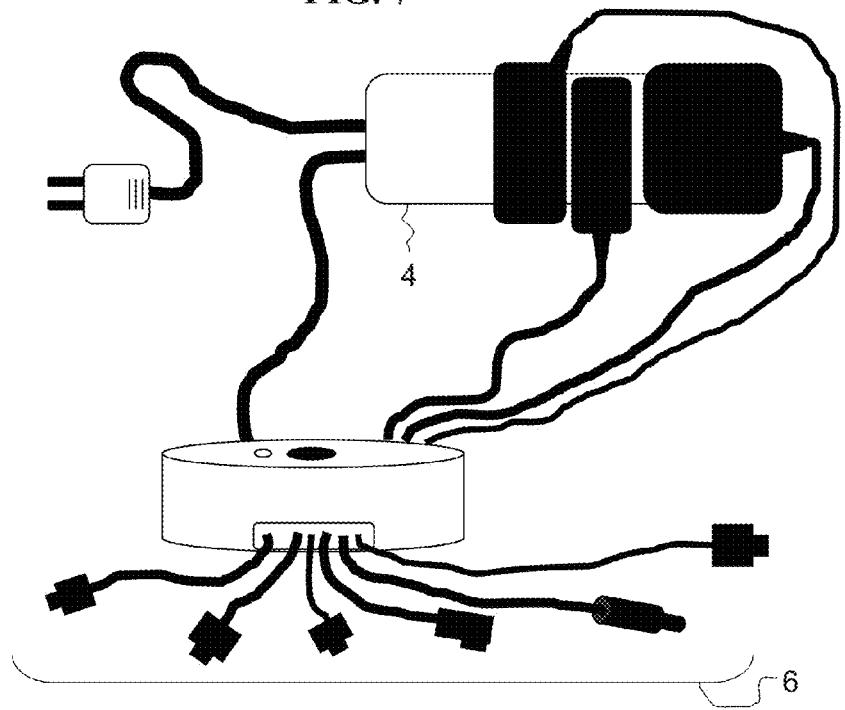
FIG. 8 illustrates the preferred alternative in the preferred style.

FIG. 8 illustrates the preferred alternative in the preferred style.

It should be noted that in the example of FIG. 8 that said at least one adapter (6) consists of three individual chargers and of three cables connected to said single power supply source of the device (4).

Figure 9:
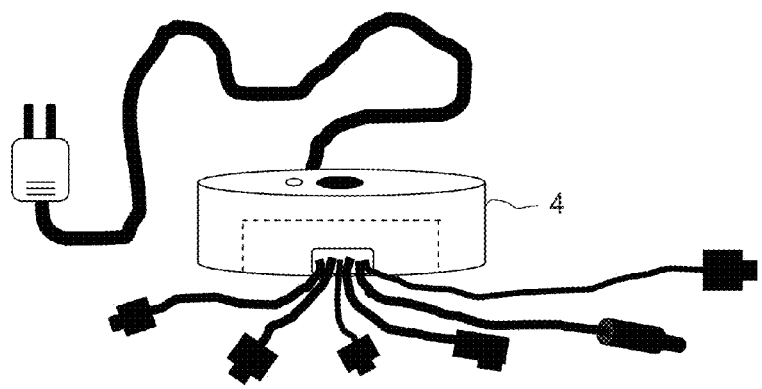
FIG. 9 illustrates a third alternative of the invention in a single piece.

FIG. 9 illustrates a third alternative of the invention as a single piece, the particularity of which relatively to the previous alternatives is that it only comprises at least one very low DC voltage power supply, for example providing a voltage of 5V and a maximum current of 4.2 A, in order to recharge said at least one portable appliance. In this example, controlled outputs at the mains voltage are not proposed for powering external chargers. Nevertheless, the same internal structure comprising a control circuit powered by a first power supply and means for switching the power supply source in order to recharge the appliances may be retained. This being the case, there is no departure from the scope of the invention and in this example, the control circuit is powered by said very low voltage power supply source and/or if the measurement of the current is conducted globally or by output to the secondary of said power supply source. A simple starting button and an indicator for signalling operating states of the device are proposed in this example but the interface with the user may use more resources or more sophisticated means without departing from the scope of the invention.

Figure 10:
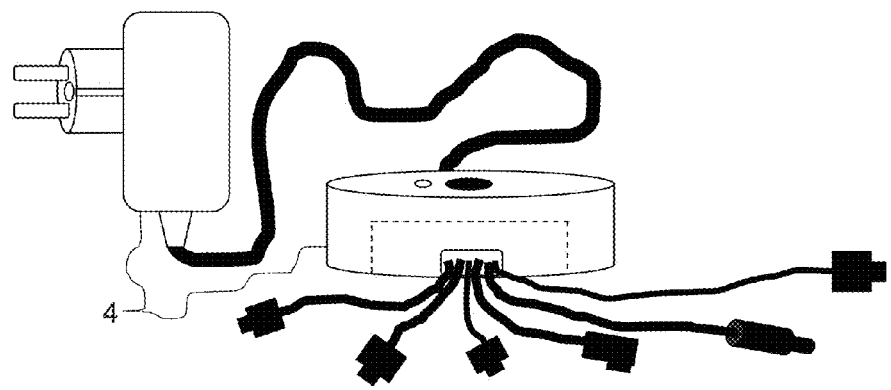
FIG. 10 illustrates a third alternative of the invention in two pieces.

FIG. 10 illustrates the third alternative of the invention in a version where the applied means in the device according to the invention are distributed in two sub-assemblies allowing substantial reduction in the bulkiness of the visible portion of the system.

Figure 11:
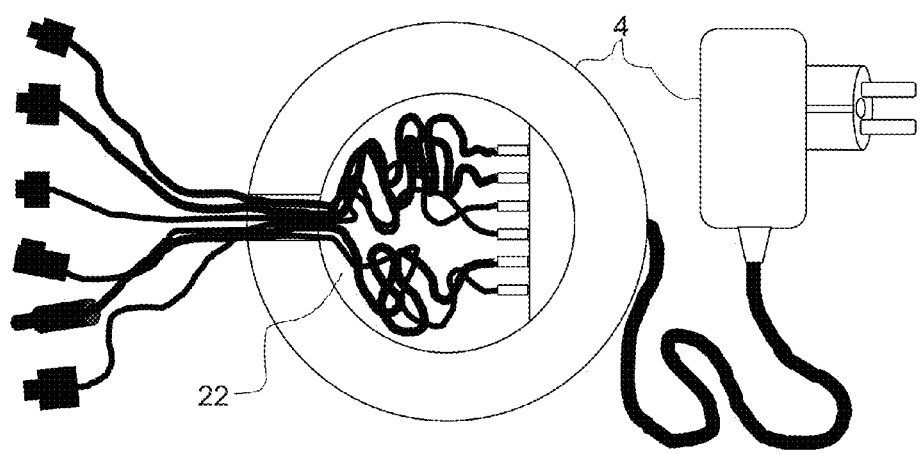
FIG. 11 illustrates the third alternative of the invention as seen from below.

FIG. 11 illustrates the third alternative of the invention as seen from below. A housing is seen for accessing the socket intended for the cables of the adapters and for containing the excess length of these cables. A part forming a lid is provided for blocking the cables at their exit and for preventing the excess length from exiting the housing by the effect of gravity when the device is lifted.

Figure 12:
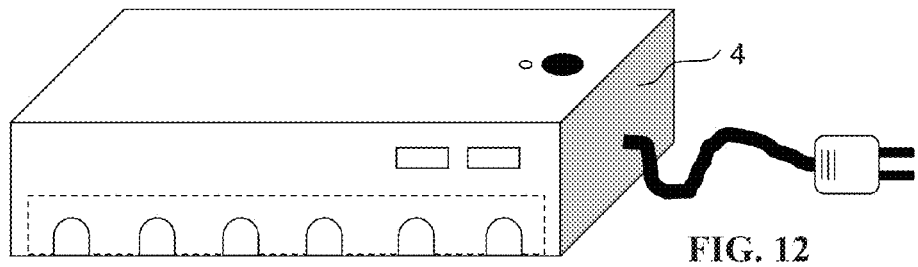
FIG. 12 illustrates a fourth alternative of the invention.
Figure 13:
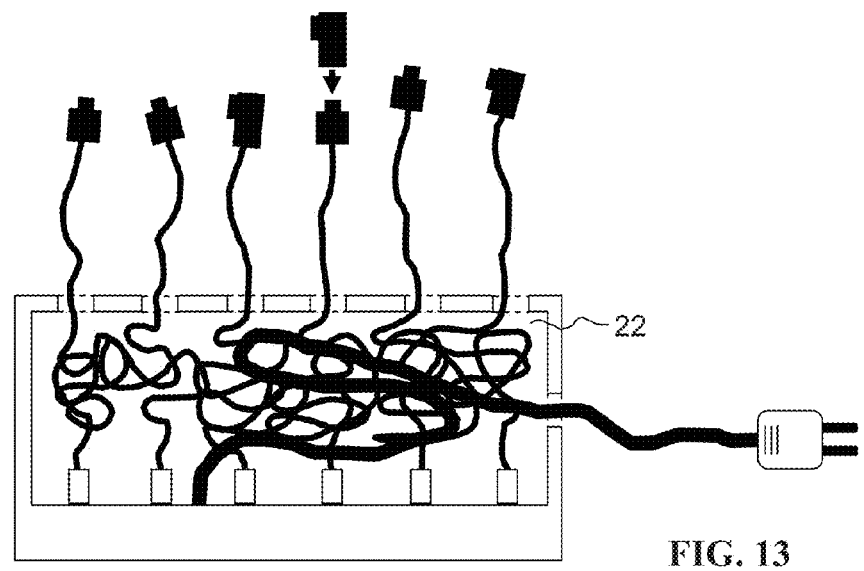
FIG. 13 illustrates the fourth alternative with simple cables.
Figure 14:
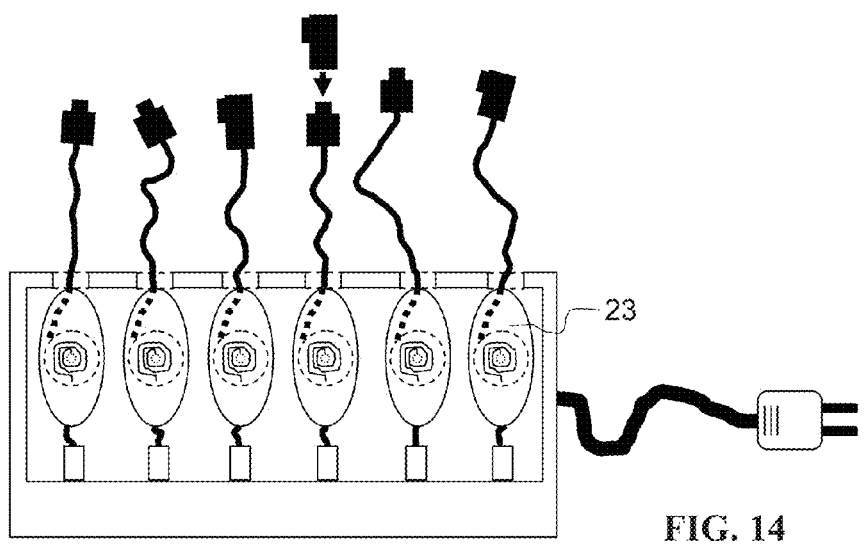
FIG. 14 illustrates the fourth alternative with winder cables.

FIGS. 12, 13, 14 illustrate a fourth alternative of the invention. This is an alternative close to the previous alternative. FIG. 13 in the bottom view shows the housing with which the excess cable length may be concealed both for the cables connecting to the portable appliances and for the power supply cable. As in the case of FIG. 11, a closing part is provided in order to maintain the excess cable portions in place. FIG. 14 illustrates the use of winder cables.

Figure 15:
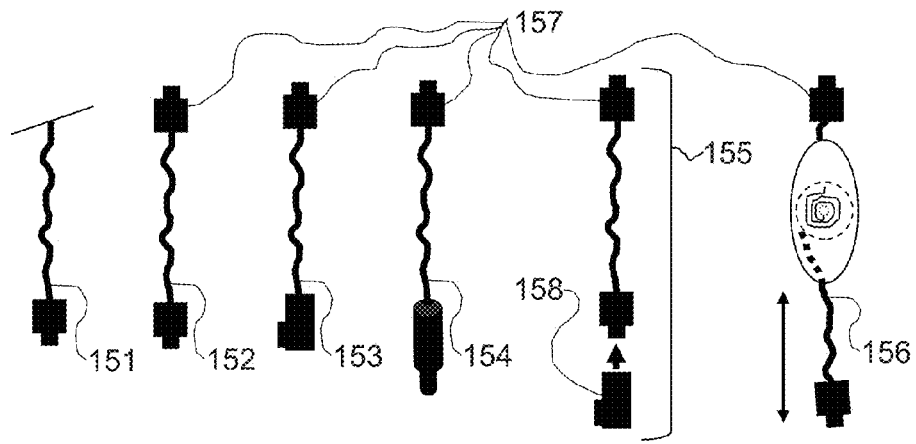
FIG. 15 illustrates alternative cables of the first sub-assembly.

FIG. 15 illustrates alternative cables 151-156 for connecting the portable appliances to the device according to the invention. These are alternatives of said first assembly. The alternative 151 is a cable permanently connected to the device and has an overmoulded plug on the side of the portable appliance. This plug is suitable for recharging at least one portable appliance. In practice, the most advantageous choice is that of a plug standard, as universal as possible, for which the voltage associated with the format of the connector is if necessary compliant with that delivered by the device. A connector with the mini-USB or micro-USB format associated with a voltage of 5V, without any current limitation other than the maximum capacity of the power supply source of the device is the preferred choice. The other exemplary cables 152-156 are fitted with an overmoulded connector at both ends. The connector 157 provided on the device side is compliant with a single standard for a given device, for example connectors with the mini-USB standard. This characteristic allows connection of any type of cable of the device and if necessary allows the standard change function to be fulfilled for portable appliances requiring the support of a different standard for recharging. Example 152 is a cable, the two connectors of which are identical. At least the examples 153 and 154 are adapters, the connector of which on the portable appliance side is different from the single standard used for connection to the device. Either one or both of the connectors of these cables made by overmoulding, may if necessary comprise means such as diodes in series in the circuits in order to lower the voltage provided to the portable appliance by starting with the close voltage provided by the device. The cable 155 illustrates another way of performing the change of connector and/or voltage standard. This is the use of an undifferentiated cable, for example a cable with or without any connector on the device side, but which is equipped at its end provided for the portable appliance, with a connector in a single format, if possible the same connector format as for the device side if necessary, this for making the side of the cable immaterial in its installation, in order to simplify manufacturing and allow savings in scale. The connector format converter 158 made by overmoulding may comprise means for lowering the voltage if necessary. The connector of the provided format converter for receiving that of the end of the cable will advantageously have dimensional and/or shape characteristics slightly different from the standard to which it refers in order to ensure a tighter assembly than the normal assembly. The goal is to produce an assembly more resistant to traction between the connector of the cable and its corresponding one on the format converter side than between the other connector of the format converter and its corresponding one of the portable appliance so that when the cable is pulled, it is the converter which disconnects from the portable appliance and not the cable which disconnects from the converter. Advantageously, the unused wires in the cables for recharging portable appliances and which would normally be used for ensuring continuity of unused contacts such as the contacts D− and D+ of an USB connector, may not be mounted. In the case of the use of these contacts for signaling to the portable piece of equipment that it is connected to a power supply capable of going beyond the intensity limit associated with a connection standard such as USB, then the suitable use of these circuits may be achieved locally directly in said at least one overmoulded connector on the portable appliance side and advantageously in both identical connectors in order to allow undifferentiated assembly of the ends of the cable. Thus, an economical cable with two non-shielded wires may be used in the place of a cable with four possibly shielded wires and more costly. Said suitable circuits for signaling a recharging mode which is not limited in current may nevertheless be also applied in the wiring of possible connectors on the device side and/or in that of possible connector type changing devices in order to allow the use of completely standard cables if necessary.

Figure 16:
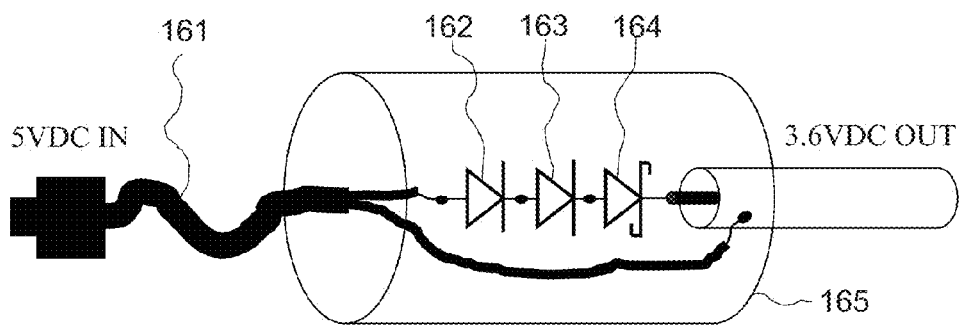
FIG. 16 illustrates a cable with another connector and another voltage.

FIG. 16 illustrates a cable 161 directly carrying out the change in connector and voltage type.

This is an example of applying the voltage changing device according to the invention which in a simple and effective way allows the voltage provided by the device to be lowered when the latter is close to the one to be provided to the portable appliance. The proposed solution is based on the use of one or more diodes (162, 163, 164) mounted in series in the positive branch of the circuit and the whole is overmoulded in order to form the complete connector 165. With the direct voltage drops at the terminals of these dipole units which are the diodes (162, 163, 164), with a value of 0.6V per standard silicon diode (162, 163) and of 0.2V per Schottky diode (164), a voltage of the order of 3.6V may be provided to the portable appliance starting from the 5V voltage provided by the device.

Figure 17:
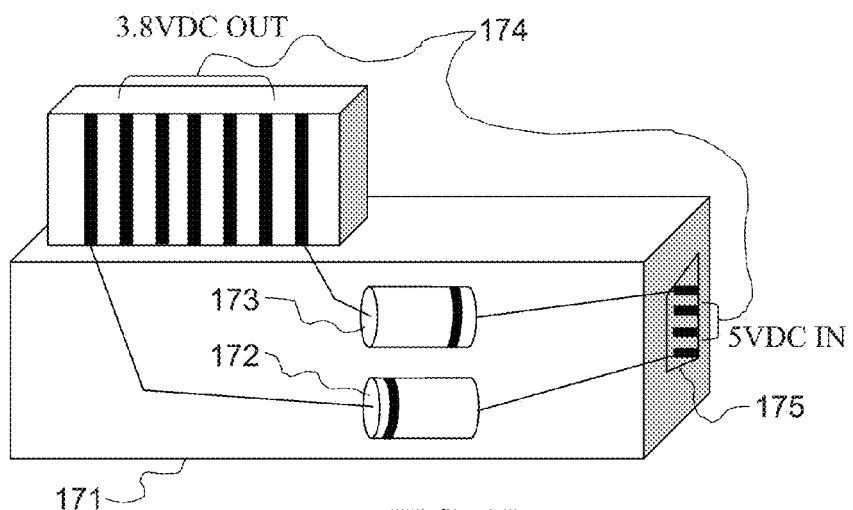
FIG. 17 illustrates a device for changing connector and voltage type.

FIG. 17 illustrates a connector and voltage type changing device.

This example illustrates a particularly economical embodiment of a standard changing device with a voltage step-down device according to the invention 171. In this case, the question is to provide to a portable telephone from the 5V of the device, a charging current of 355 mA at a voltage of 3.8V; this voltage of 3.8V being in the tolerance for a provided rated voltage of 3.7V for the relevant telephone version. For example two economical diodes of the 1N4001 series (172, 173) are used which are capable of supporting a permanent current and a voltage above the needs of the application. By mounting a diode in each branch of the power supply and directly using the wires of the crossing version of these diodes in order to join the suitable contacts of both connectors, it is possible to produce the electric circuits without any additional components and there is nothing more than to overmould this assembly in suitable plastic material in order to produce the connector and voltage type changing accessory according to the invention. Advantageously, the unused contacts 174 of the connectors may not be mounted. The connector 175 on the cable side is advantageously designed for force-fitting the connector of the cable with the purpose of producing an assembly which resists simple traction on the cable.

Figure 18:
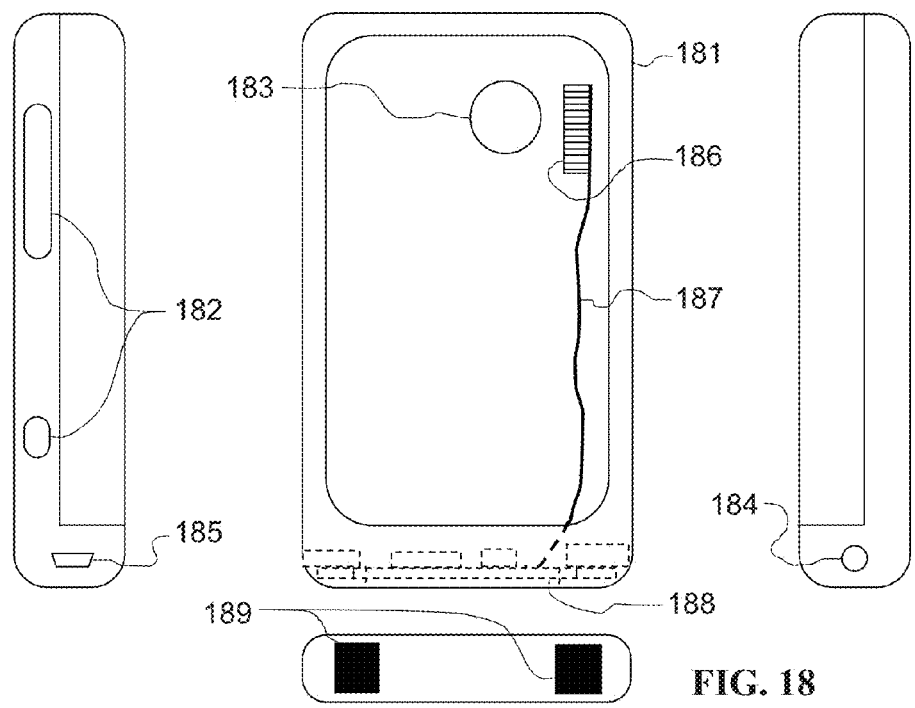
FIG. 18 illustrates said second sub-assembly with contact recharging.

FIG. 18 illustrates said second sub-assembly, recharging through contacts.

The second sub-assembly is specifically designed for a given portable appliance version in order to standardize at least its characteristics related to recharging. Said second sub-assembly comprises means capable of providing the sought standardization relatively to recharging, these means being made integral with the portable appliance in a way which depends on its own characteristics. A means which is suitable for most portable appliances is to include the means and the functions of said second sub-assembly according to the invention within the scope of protective overcladding which many users purchase naturally for its protective function of their portable appliance and if necessary by taking into account aesthetic considerations or visual differentiation which may be particularly useful for more easily locating one's own appliance within a plurality in the case of a common version. The overcladding according to the invention is advantageously produced in an extensible material such as an elastomeric material. The extensible material solution is particularly well suited to one-piece portable appliances but less or not at all to portable appliances comprising mobile components such as a sliding or rotating keyboard or further portable appliances having the shape of a shell comprising two jointed portions. For these appliances, the overcladding should be partial or comprise the number of portions and joints which are suitable for adaptation to the mechanical characteristics of the portable appliance and to the relative movements of the portions which make it up. In order to firmly attach all or part of the components of the overcladding of the corresponding portions of the portable appliance when it is not possible to use returns of the extensible material for providing sufficient hold, provision is made for using so-called repositionable adhesives which allow subsequent disassembly without damaging the surfaces stuck beforehand.

Proposing collections of alternative colours and/or patterns and/or drawings is provided for meeting the need of fast visual differentiation which is notably useful in the case of most common appliance versions. Minimization of the bulk volume increase of the overcladded portable appliance is provided relatively to the naked version of the relevant appliance. This being the case, alternative overcladdings, notably intended for children or further for professional uses, overcladding versions are provided, the external volume of which is substantially larger than that of the naked appliance in order to further provide a protective function strengthened against impacts and falls of the appliance. At the very least, the means applied in said second sub-assembly comprise those which are required for ensuring continuity of the electric circuits between the contacts provided within the scope of the interface with said first sub-assembly. These means comprise the suitable contacts, the connector suitable for connection with charging circuits of the portable appliance and according to the distance separating said contacts from the connector of the portable appliance, means for ensuring the continuity of the actual circuits. These may be wiring solutions based on wires of low bulkiness or printed conductors on flexible plastic material surfaces. In particular, when the suitable connector of the portable appliance is not located on the same side as said contacts of the interface with the first sub-assembly, it is provided that the connector belonging to said second sub-assembly has a reduced or even inexistent protruding portion when the connector is inserted in the corresponding base of the portable appliance. When it is necessary to disconnect this assembly, for example in order to replace the overcladding, provision is made for being able to do this by attachment means, for current tools on the connector of the second sub-assembly or further by exerting traction on the applied means for ensuring the continuity of the connections. This operating procedure is suitable even if it causes a risk of failure of one or more electric circuits considering that the most frequent question is to replace the overcladding and that in any case, this accessory is most often inexpensive. In the luxury overcladding versions which are also provided within the scope of applying the invention, means allowing an extraction without any risk of the portable appliance are proposed. By luxury version are meant versions characterized by the high quality and/or the precious character of the applied materials and/or the fact that this is an accessory labeled with a luxury brand. Although the power supply of the second sub-assembly is provided within the scope of the invention, it is easier to apply means for providing a DC voltage in the device. In the case of a DC voltage, the interface between said first and second sub-assemblies is polarized. Consequently, protective means against polarity inversions and means for making said second sub-assembly insensitive to the polarity of the voltage powering it are provided. The first means are based on an asymmetry of the applied mechanical components or of the components related to the electric contacts between the first and second sub-assemblies. When safe protection cannot be obtained by the layout of the mechanism of the sub-assemblies or that such a layout has a non-negligible additional cost or further when it is detrimental to attractiveness, then the addition of a blocking diode is provided in the case of polarity inversion, which is mounted in series in the power supply circuit within said second sub-assembly. At the price of four diodes mounted as a rectifier bridge, the second sub-assembly becomes indifferent to polarity of the connection between both sub-assemblies and recharging is ensured in all cases. Of course, in the case of adding diodes in the circuit(s), provision is made for taking into account the voltage drops which they introduce, for determining the value of the voltage of the power supply source of the device in order to provide the voltage expected by the portable appliance for its recharging. In the example of FIG. 18, this is overcladding 181 comprising two portions adapted to the case of a portable telephone version equipped with a sliding keyboard. In addition to the functions related to the recharging of the portable appliance, the overcladding comprises means for restoring the original resources of the portable appliance which are the control button 182 and a camera 183. The applied means for restoring original resources of the appliance in the second sub-assembly are here holes made in the wall of the overcladding. It is provided that the holes in the wall of the overcladding are substantially wider than the original resource to be restored in order to take into account possible variations in the assemblies in particular in the case of the use of flexible and extensible materials. Furthermore it is provided that the second sub-assembly comprises two additional connectors relatively to those of the relevant portable appliance. One of the additional connectors 184 allows standard earphones fitted with a standard 3.5 mm jack plug to be connected onto this telephone which originally could only be connected to an earphone version provided by the manufacturer equipped with a proprietary connector. The other additional connector is a mini-USB connector 185 allowing both connection to a computer and recharging by a standard charger which is particularly useful during travelling or further in the case of failure of the device. In both of these cases of additional connector, these are standard connectors functionally equivalent to the original specific multi-use connector which equips the portable appliance. The connection to the original multi-use connector of the portable appliance is ensured by a connector 186 which differs from a known connector in that it does not have any protruding portion when it is introduced into the base of the portable appliance. The connector according to the invention is soldered at a low temperature on a flexible printed circuit 187 which ensures continuity of the electric circuits, for recharging, for earphones, and for the USB connection, from the connector up to the printed circuit 188 supporting the additional connectors (184, 185), the contacts 189 of the interface with the first sub-assembly and if necessary the other electronic components of the second sub-assembly. In the case when connections to several original connectors of the portable appliance are required for accessing the required circuits, then corresponding connectors according to the invention are positioned on the same flexible printed circuit or on one or more additional flexible printed circuits. It should be noted that the selection of the placement of the contacts of the interface with said first sub-assembly is arbitrary; it is convenient to place them on the small side of the bottom in the natural orientation of the appliance. This being the case, there is no departure from the scope of the invention in the case of another selection for positioning the contacts, for example on a small lateral side in the case of an appliance for which the natural orientation is with a large side upwards or further, if the contacts are positioned on the rear face of the appliance for recharging with the appliance laid down flat on a bearing surface according to the invention.

Figure 19:
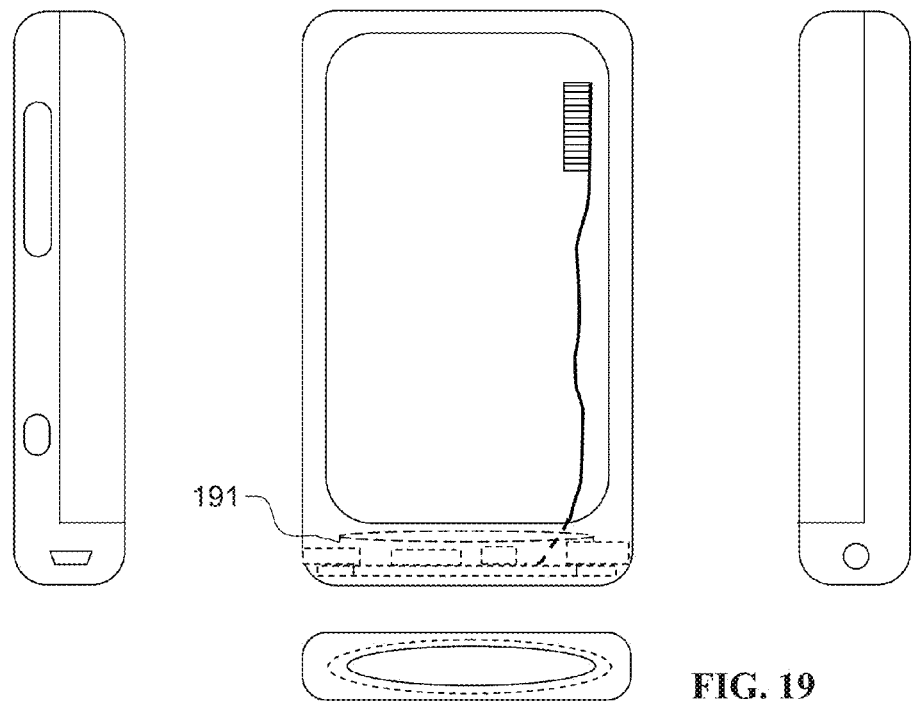
FIG. 19 illustrates said second sub-assembly with induction recharging.

FIG. 19 illustrates said second sub-assembly, recharging by induction.

FIG. 19 is in every point similar to FIG. 18 except on the level of the means applied for transferring electric energy between said first and second sub-assemblies. In the example of FIG. 19, at least one secondary inductor is used in the place of electric contacts of FIG. 18. All the explanations of FIG. 18 remain valid for FIG. 19. Those which specifically deal with electric contacts within the scope of FIG. 18 remain valid within the scope of FIG. 19 by replacing the notion of contacts with at least one secondary inductor.

Only the problem of the polarity of the interface is not posed in the case of the application of inductors.

Figure 20:
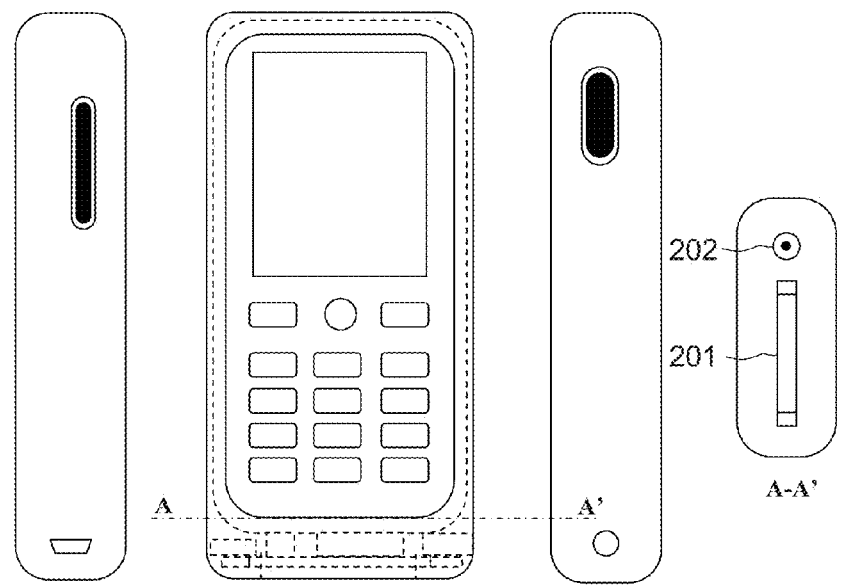
FIG. 20 illustrates a first portable appliance in its sub-assembly.

FIG. 20 illustrates a first portable appliance on its sub-assembly.

FIG. 20 illustrates another alternative embodiment of the second sub-assembly according to the invention. FIG. 20 illustrates the portable telephone inserted in suitable overcladding. The minor differences relatively to the cases described in the previous figures are associated with the fact that this example relates to a single-piece portable telephone which is particularly well suited for overcladding with an extensible material. Another minor difference is that the multi-use connector 201 of this telephone version is placed on the same side as the one selected for receiving the interface with said first sub-assembly as this is illustrated by section A-A', that the circuits for recharging the appliance pass through a power supply connector 202 separated from the multi-use connector 201. Thus, it is unnecessary to provide a connector without any protrusion and a flexible means for ensuring continuity of the electric contacts. This may be directly accomplished from a multi-use connector and a power supply connector corresponding to that of the portable appliance, directly soldered on the printed circuit of the second sub-assembly. Apart from the points above, all what has been described for FIG. 18 in particular as regards overcladding generally and the use of electric contacts remains true for FIG. 20. Transposition to the case of application of means for energy transfer by induction is also provided as in the case of FIG. 19 and with the associated further explanations.

Figure 21:
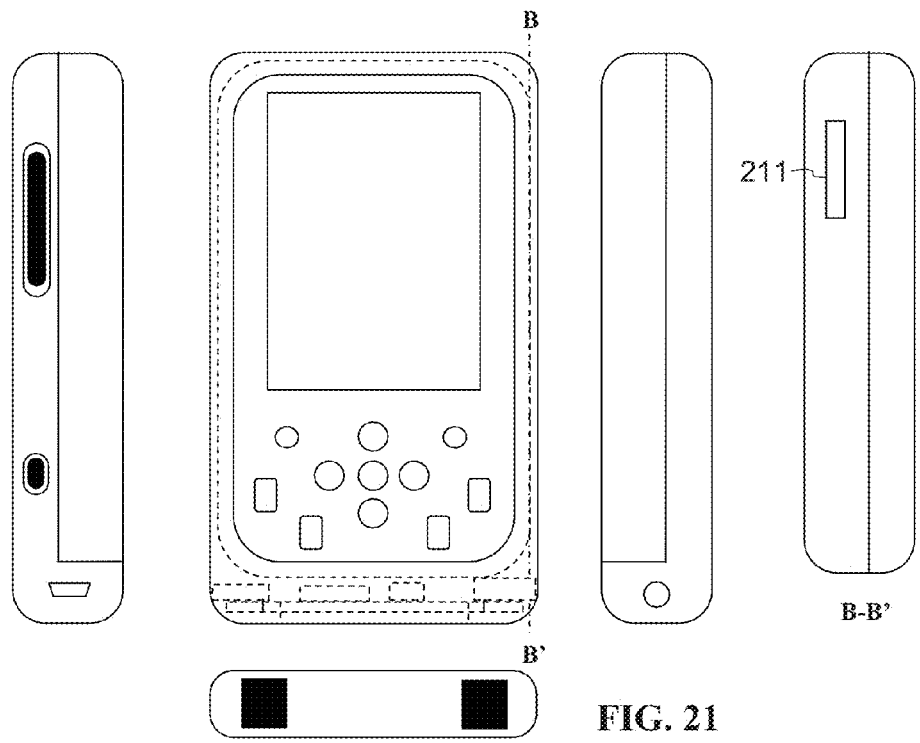
FIG. 21 illustrates a second portable appliance with a sub-assembly.

FIG. 21 illustrates a second portable appliance with the second sub-assembly. This is the second sub-assembly of FIG. 18 with the corresponding telephone installed inside. Section B-B' shows the location of the multi-use connector on the side of the portable appliance.

Figure 22:
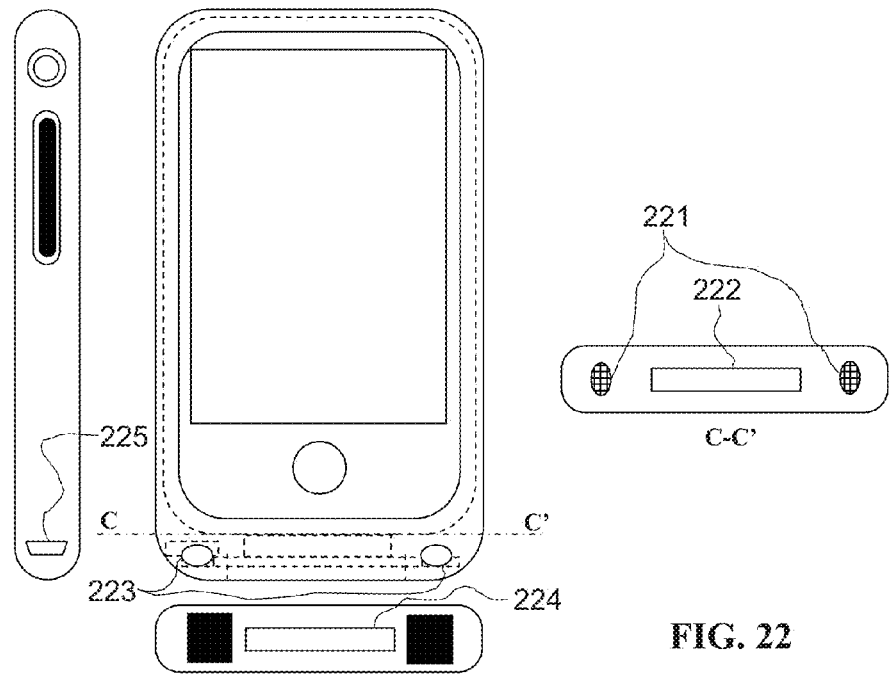
FIG. 22 illustrates a third portable appliance with a sub-assembly.

FIG. 22 illustrates a third portable appliance installed in the second corresponding sub-assembly. What distinguishes this case from those illustrated by the previous figures is that in this alternative of the second sub-assembly, the resources: loudspeaker output 221 and original multi-use connector 222 appearing in the section C-C' are restored by the second sub-assembly in 223 and 224 respectively. In this example, these original resources of the appliance are restored. It should be noted that the restoration of the original resources may advantageously be accompanied with improvements without departing from the scope of the invention. In this example, the loudspeaker outputs are improved. This is a functional improvement obtained by sending back the sound towards the user by means of bent conduits inside the second sub-assembly. The multi-use connector is restored identically so as to allow connection of all the accessories provided for this portable appliance. An additional standard connector 225 has however been added in order to allow the use of USB cable and/or of a standard charger as an alternative to the original accessories.

Figure 23:
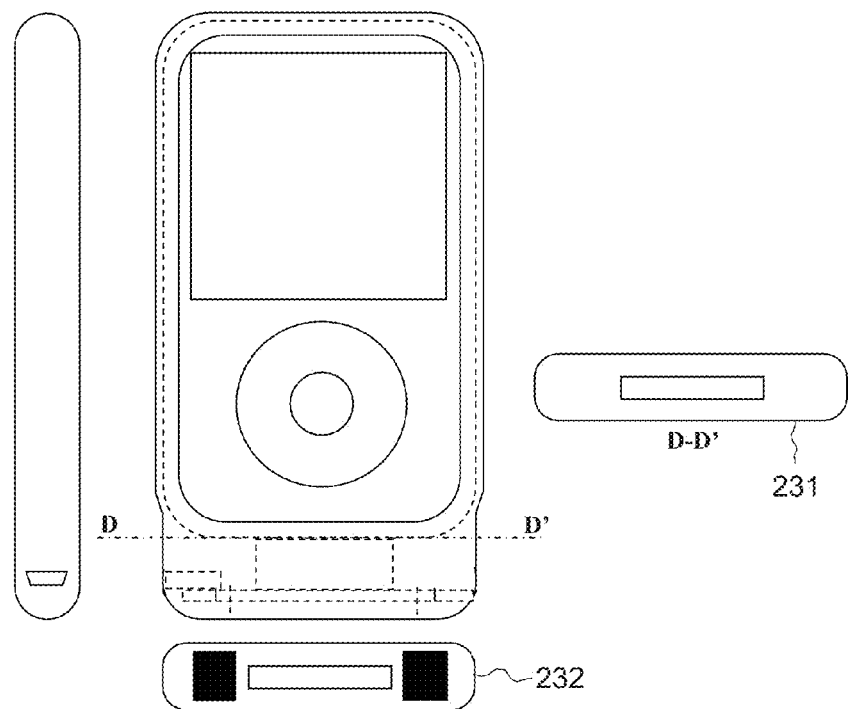
FIG. 23 illustrates a fourth portable appliance with a sub-assembly.

FIG. 23 illustrates a fourth portable appliance installed in the corresponding second sub-assembly. What distinguishes this case from those illustrated by the previous figures is that in this alternative of the second sub-assembly, the new original resource which is restored in addition to the multi-use connector is the whole of the dimensional characteristics of the end of the portable appliance. Section D-D' shows that the section 231 of the small side of the bottom of the appliance is identical to that of the end of the second sub-assembly 232. This is advantageous for portable appliance versions for which there exist accessories comprising a hollow shape for receiving the appliance with, if need be, a connector mating the one of the portable appliance at the bottom of the hollow shape. Thus, the second sub-assembly according to the invention may equip the portable appliance in a perfectly transparent way towards the environment of the latter.

Figure 24:
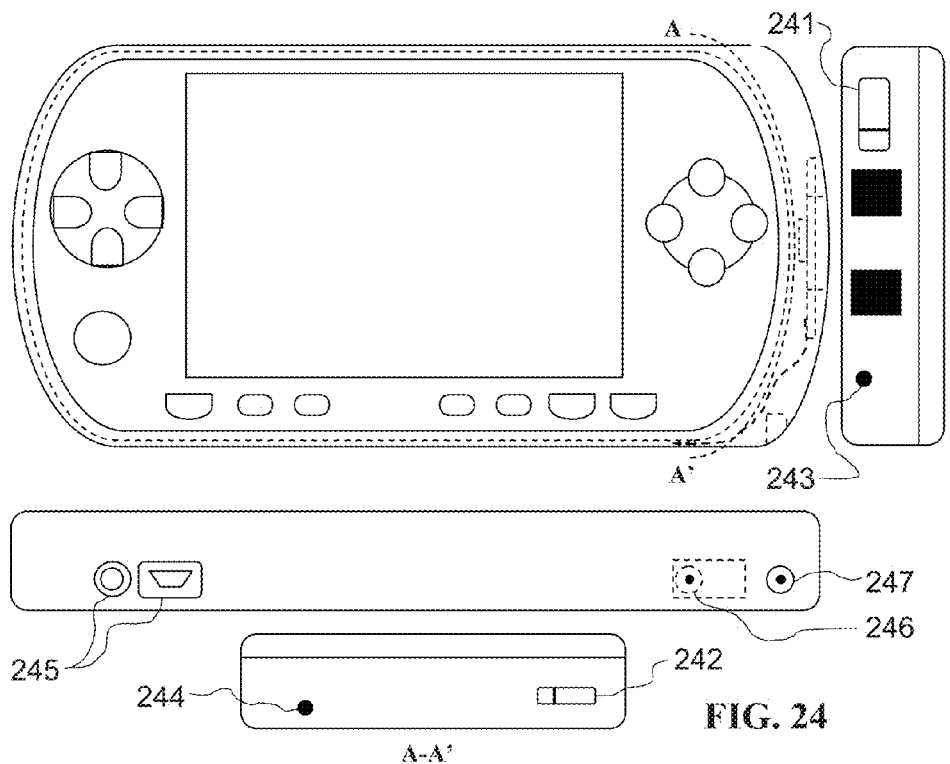
FIG. 24 illustrates a fifth portable appliance in one orientation.

FIG. 24 illustrates a fifth portable appliance which, in this example, is a game console. In this alternative, provision is made for the interface between said first and second sub-assemblies of the adapter according to the invention being placed on one of the small sides of the appliance. This characteristic implies that the appliance is oriented for its recharging, perpendicularly to its natural orientation. This is advantageous within the scope of the invention in that this reduces the surface area used per appliance to be recharged on the device. Further there is no disadvantage in the change of orientation within the scope of recharging via a second sub-assembly according to the invention, in that this type of appliance is generally not used when it is recharged. Moreover, this is another advantage of the restoration or the additional provision by said second sub-assembly of at least one connector for recharging the appliance. The possibility of recharging the appliance via a cable if required allows an appliance to be recharged while using it without any limitation on duration. In this example, original resources of the appliance are restored by the second sub-assembly, as holes 245, for allowing access to the connectors of the appliance, as a light conductor 243 for restoring the indicator 244 of the appliance, as an additional connector 247 identical with the original one 246 in order to allow powering via a cable and as a mobile part 241 meshing with the original button 242 of the appliance which is no longer accessible for restoring its function on the second sub-assembly.

Figure 25:
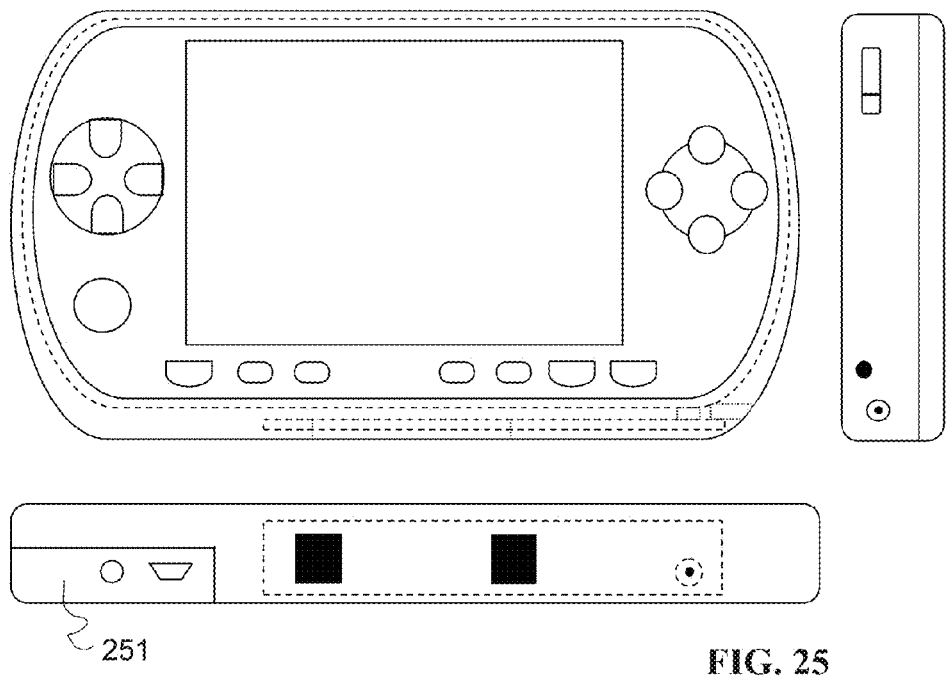
FIG. 25 illustrates the fifth portable appliance in another direction.

FIG. 25 illustrates the appliance of FIG. 24 in another alternative second sub-assembly observing the natural orientation of the appliance for its recharging position. In this example, the second sub-assembly only partly surrounds the portable appliance while leaving recessed areas 251.

Figure 26:
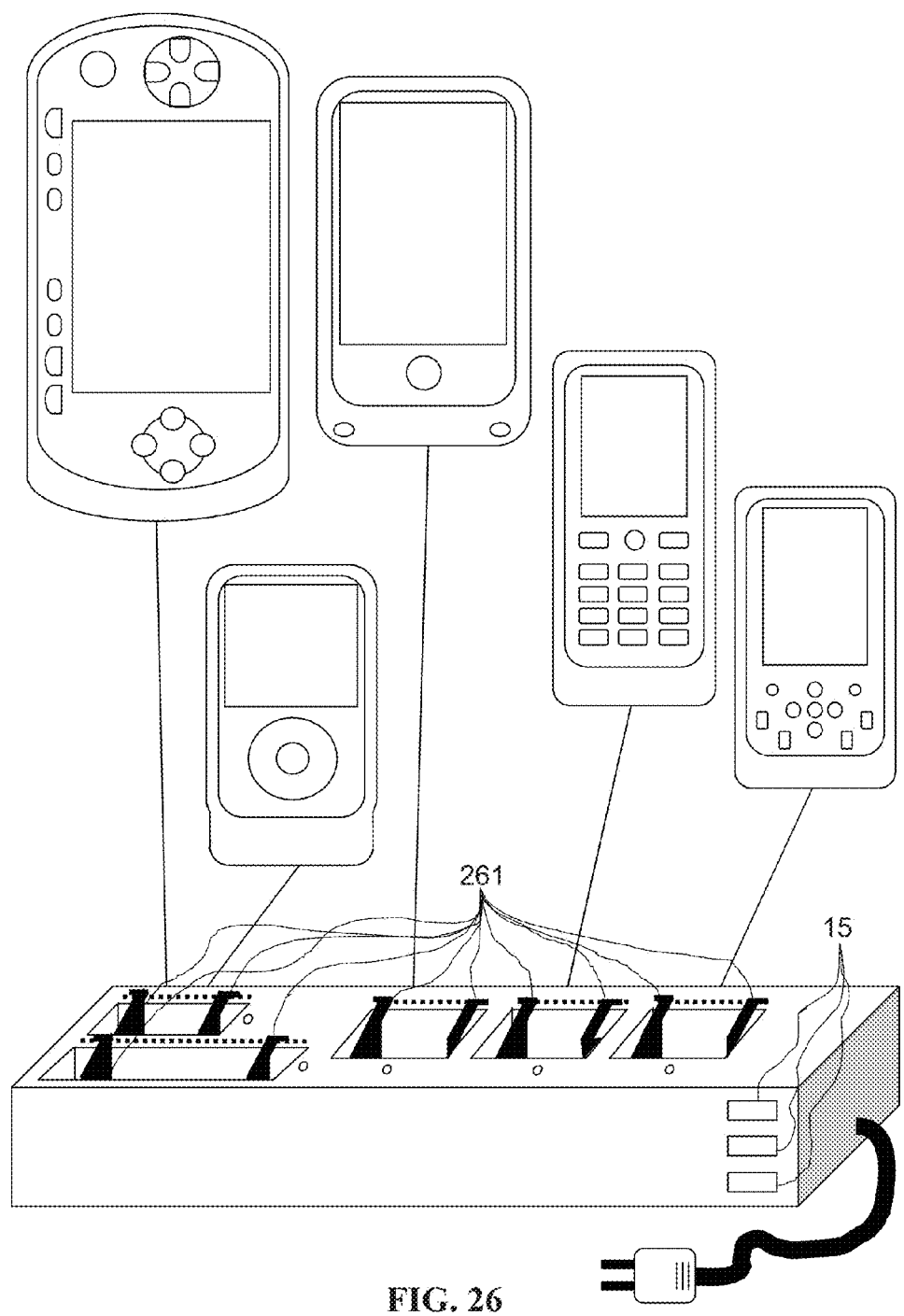
FIG. 26 illustrates a first embodiment of the system.

FIG. 26 illustrates a first embodiment of the system according to the invention allowing recharging of a plurality of portable appliances of distinct designs or totally or partly identical. The recharging is carried out at least simultaneously for part of the appliances. Indeed, according to a refinement of the invention, when the maximum power capabilities of the power supply source of the device are reached, the charging of the appliances remaining to be recharged is carried out in a sequential mode. This example illustrates an alternative comprising several locations with different sizes for covering most of the needs without however maximizing the size of each location so as to allow all of them to receive more bulky appliances. Adjustable guiding means 261 allow adaptation of the width of the recharging locations to that of the portable appliances, other means such as for example a blade of flexible material forming a spring allow adaptation of each location to the thickness of the appliance. Sockets 15 for connecting the first sub-assemblies therein in the form of cables are advantageously comprised in the device in order to be able to recharge additional appliances or appliances which do not fit into the provided locations.

Figure 27:
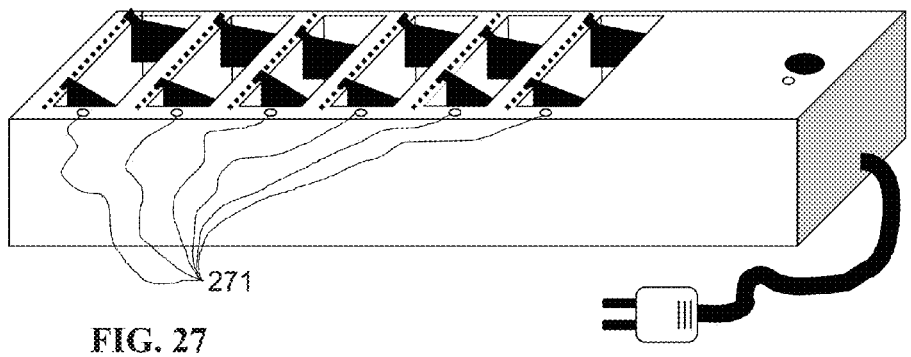
FIG. 27 illustrates a second embodiment of the system.

FIG. 27 illustrates a second embodiment of this system which differs from that of FIG. 26 by an orientation of the recharging locations which is perpendicular to the main axis of the device. In this example, the recharging locations all have the same maximum width and are equipped with an indicator 271 for indicating their functional condition. In this alternative, the guiding means which are adjustable depending on at least the width of each portable appliance do not exert any pressure on the appliance. It is provided that in certain sophisticated alternatives, electrically controllable means for maintaining the appliance at the bottom of its location during recharging release the appliance when charging is considered as having ended.

Figure 28:
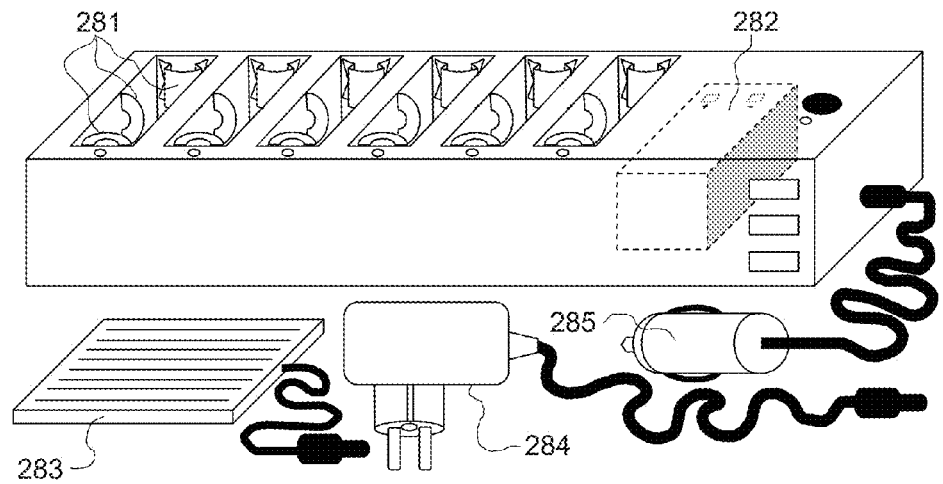
FIG. 28 illustrates a third embodiment of the system.

FIG. 28 illustrates a third embodiment of the system which differs from that of FIG. 27 by one of the recharging locations comprising a system for adaptation to the dimensions of the portable appliances which does not require any adjustment from the user. Means 281 exerting pressure in the direction opposite to their attachment face automatically place the portable appliance in the recharging position when it is inserted. By the combined effect of the forces exerted by the automatic positioning means and of the frictional forces of these means on the second sub-assembly and/or on the portable appliance, the appliances are maintained safely in the recharging position. This feature makes this alternative particularly advantageous for vehicle uses. This exemplary embodiment further illustrates the case of a self-contained energy source 282 comprised in the device. Thus, after prior charging of the self-contained source by connecting the device to an external energy source during the required time, the device is capable of recharging said at least one portable appliance in a complete self-contained way until depletion of the capacities for storing the onboard energy source. This example also illustrates the capabilities of connecting the device to any external energy source in order to recharge said at least one portable appliance and the onboard energy source if necessary. For example, connection to a photovoltaic panel 283, to the low voltage electric network 284 or to a very low voltage vehicle network is obtained here by means of a connector adapted to cigar lighter sockets 285.

Figure 29:
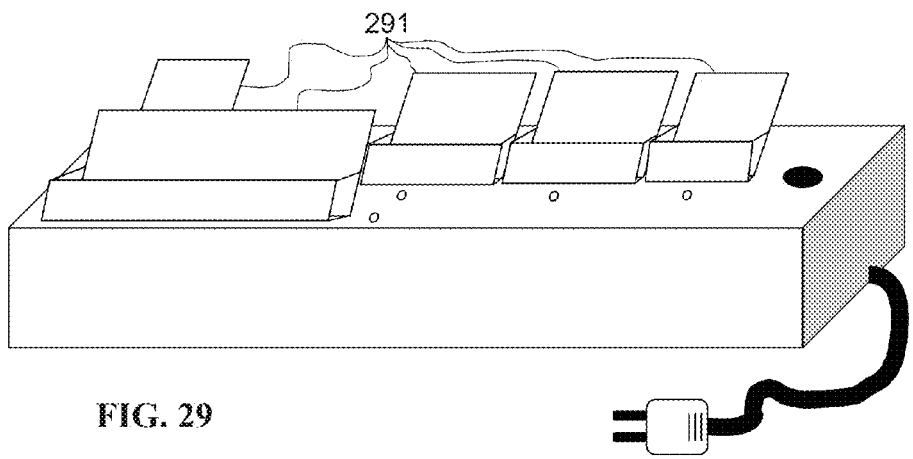
FIG. 29 illustrates a fourth embodiment of the system.

FIG. 29 illustrates a fourth embodiment of the system in which the locations for recharging 291 are locations dedicated to given portable appliance versions and have dimensional characteristics and if necessary electric characteristics which are perfectly adapted to each of them.

Figure 30:
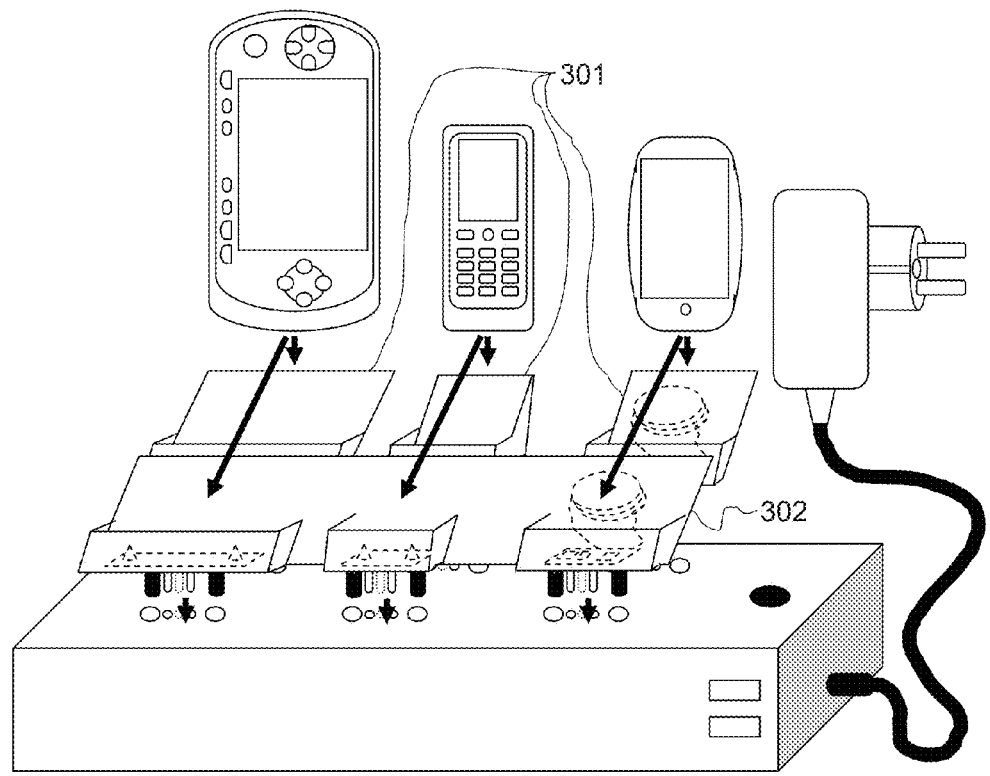
FIG. 30 illustrates a system with removable interfaces.

FIG. 30 illustrates a system with removable interfaces. This example differs from the one of FIG. 29 in that the recharging locations dedicated to given portable appliance versions are removable. The alternative corresponding device is laid out so as to allow a large number of mounting combinations and/or models of removable recharging locations. It is further provided that the removable recharging locations are provided as an object 301 in order to receive a single portable appliance and/or as an object 302 for receiving several identical or different portable appliances for at least one portion of them. As this last solution is advantageous for certain brands proposing a range of complementary appliances, possession of the location for several appliances of a given brand may incite the user to acquire other appliances of this brand. The recharging location provided for several appliances is also well adapted to a distribution of portable appliances, as batches of several appliances.

Figure 31:
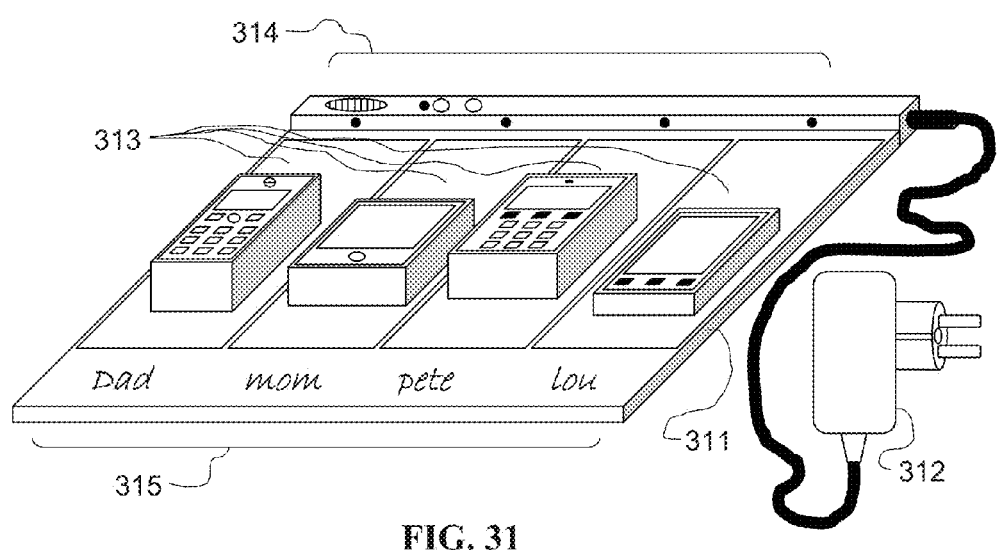
FIG. 31 illustrates a planar system comprising a bearing surface.

FIG. 31 illustrates a planar system comprising a bearing surface.

In this advantageous alternative, the bearing surface 311 is the only visible portion of the system according to the invention, the bulky portion of the device which further ensures galvanic insulation required for the electrical safety of the device being materialized by a socket casing 312 or a casing having a power supply cord. This technical portion of the system according to the invention may remain hidden advantageously. This example illustrates an alternative embodiment of the invention in an extra-flat form comprising a bearing plane on which are indicated recharging areas 313 where the portable appliances are laid down, most often on their rear face. It is provided that the functions of the system for recharging said at least one portable appliance are advantageously completed by means 314 and functions relating to voice messages. In this case, the signalling of the assignment of the recharging areas to given users is advantageous in that it allows individualized handling of the voice messages. This differentiation per user may also be used in association with parameterization of technical characteristics requiring even indirect and uncertain recognition of a given portable appliance by the device. The indication of the users may be based on any means, such as for example self-adhesive pictograms or direct marking of the names of the users 315 to which the recharging areas are assigned.

Figure 32:
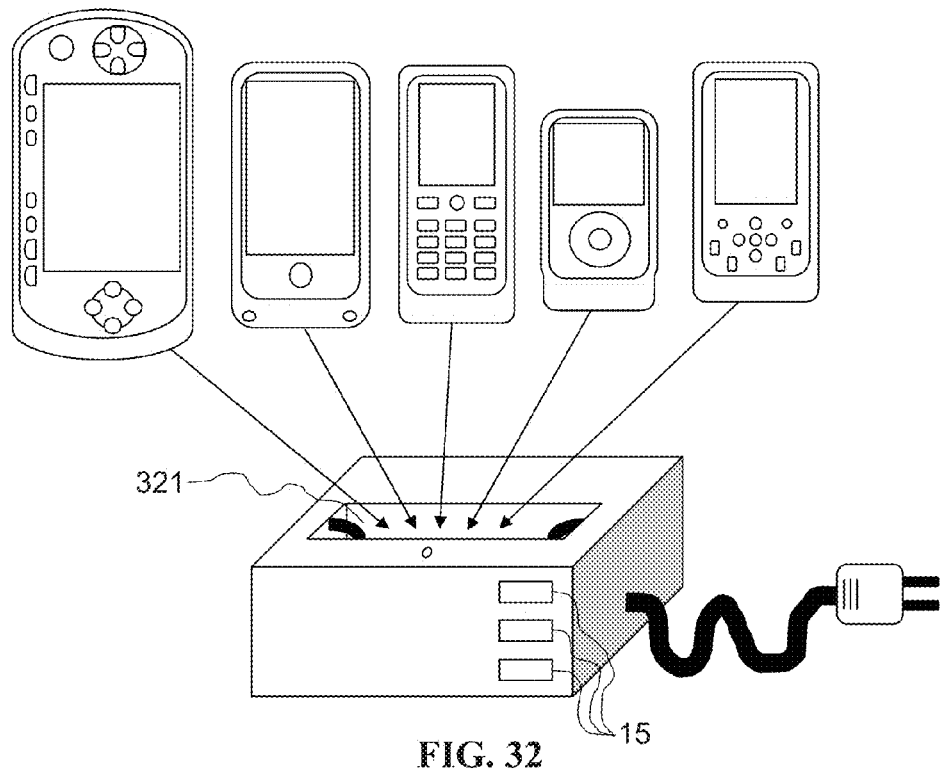
FIG. 32 illustrates a first sequential universal recharging system.

FIG. 32 illustrates a first sequential universal recharging system.

This alternative embodiment of the invention differs from the previous ones in that the device only comprises a single location for recharging. Under these conditions, the recharging operations for several appliances of identical version or of different versions are accomplished one after the other. This being the case, by providing at least one socket 15 and/or one suitable interface for recharging appliances with or without any charging supervisor or further for recharging accumulators as such, it is possible to reintroduce a capability of simultaneous recharging of several appliances if necessary. In this example, it is particularly advantageous to propose a location for the recharging 321 capable of receiving the largest number of portable appliance versions and this without requiring any prior adjustment of the device or even any manual starting command; the latter may be advantageously handled automatically by suitable means for detecting a new introduction of a portable appliance in the recharging location.

Figure 33:
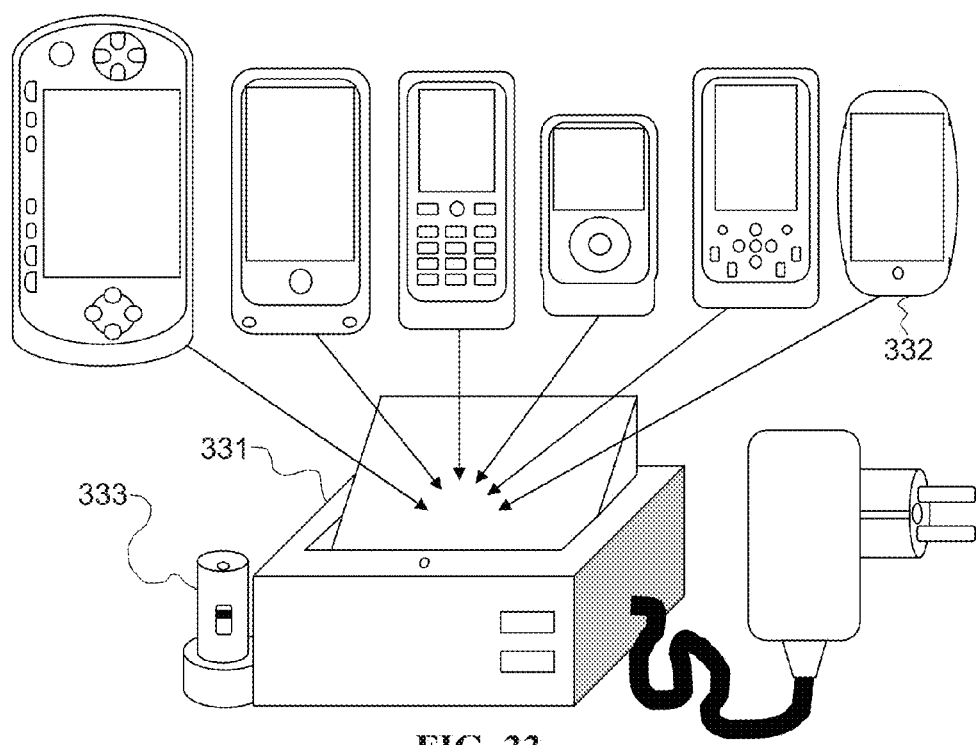
FIG. 33 illustrates a second sequential universal recharging system.

FIG. 33 illustrates a second sequential universal recharging system.

This example differs from the one illustrated by FIG. 32 by its still more universal nature. The location for the recharging, which in fact is a bearing surface provided for a single appliance, and which is tilted in order to use the applied force of gravity on the mass of the portable appliance and if need be on the mass of said associated second sub-assembly, allows the charging position to be maintained of any appliance for which the electric contacts and/or said at least one inductor are equally located in the base for recharging from the bottom or on the rear face for recharging from the rear. In this example, the device further comprises an interface for a simple portable appliance which here is a LED torch comprising an accumulator maintained under charging by the device according to the invention. The lamp is further advantageously provided with a fluorescent or phosphorescent portion or further with signalling means which are actuated when the mains power supply is cut off and/or when it is in the dark in order to easily locate the lamp in the absence of light. An autonomous illumination source which is always ready to operate, visible under all circumstances, placed in an easily accessible location known to all the users is a particularly useful functional complement within the scope of home use of the system according to the invention.

Of course, the invention is not limited to the exemplary embodiments which have just been described, many arrangements may be provided to these examples without departing from the scope of the invention, notably as regards the number, the type and the position of the connectors, the interface with the user and the mentioned standards which will necessarily change during the life time of the patent. Any combination of technical characteristics taken in the example and illustrations for creating new alternatives which have not been explicitly described is located in the field of the invention as well as any embodiment of the invention comprising additional means and/or functionalities.

The invention claimed is:

1. A universal system for recharging two or more portable appliances that each have a rechargeable battery and a charging supervisor that manages a recharging current for recharging the rechargeable battery of the respective portable appliance, the universal system comprising:
   a recharging device comprised of at least one DC power supply, a start detection element, at least one switching element, and a control circuit, the at least one DC power supply being connectable to and powered by an energy source via the at least one switching element, the control circuit further comprises at least one current-measuring element that measures at least one current for determining a total power being consumed by all loads connected the recharging device;
   at least one first sub-assembly connected to the recharging device, the at least one first sub-assembly operatively connectable to a charging port of each portable appliance,
   wherein the at least one DC power supply is configured to provide electric energy at a DC voltage to an input side of the at least one first sub-assembly, and said first sub-assembly is configured to transfer the electric energy to said one or more portable appliances,
   wherein, when the charging port of the respective portable appliances is operatively connected to the first sub-assembly for being recharged, and with the at least one switching element closed, the at least one DC power supply is connected to the energy source so the energy source powers the at least one DC power supply to provide the electric energy at a constant DC voltage to the charging port of each of the portable appliances, for recharging the rechargeable battery of each of the portable appliances under control of the charging supervisor of the respective portable appliance,
   wherein the start detection element is operatively connected to the control circuit, the start detection element arranged to detect:
   a) a direct start command from a user,
   wherein the control circuit:
   i) when the user activates the start detection element, automatically closes the switching element to automatically connect the at least one DC power supply to the energy source, and
   ii) upon an automatic determination that all of said portable appliances are not being charged, opens the switching element to automatically disconnect the at least one DC power supply from the energy source, and
   iii) upon an automatic determination that an end of the recharging of all of said portable appliances has been reached, automatically opens the switching element to automatically disconnect the at least one DC power supply from the energy source, wherein the reaching of the end of the recharging of all of said portable appliances is automatically determined by way of the measurement of the at least one current by the at least one current-measuring element allowing determination of the total power being consumed by all loads connected the recharging device, and
   iv) upon an automatic determination of the total power being consumed by all loads connected the recharging device, whether the total power being consumed exceeds a capacity of said at least one DC power supply source:
   a) when the total power being consumed is less than the capacity of said DC power supply source, applying the constant DC voltage simultaneously and continuously to all the portable appliances, and
   b) when the total power being consumed is greater the capacity of said DC power supply source, applying the constant DC voltage continuously to only a subset of said portable appliances until said subset is fully charged, and then applying the constant voltage continuously to remaining portable appliances of the portable appliances still to be recharged, until the remaining portable appliances are fully charged, or
   c) detect each appliance being operatively connected to the at least first sub-assembly for recharging,
   wherein the control circuit:
   i) when the start detection element detects the user placing one of the appliance in the position with respect to the at least first sub-assembly to be recharged, automatically closes the switching element to automatically connect the at least one DC power supply to the energy source, and
   ii) upon an automatic determination that all of said portable appliances are not being charged, opens the switching element to automatically disconnect the at least one DC power supply from the energy source, and
   iii) upon an automatic determination that an end of the recharging of all of said portable appliances has been reached, automatically opens the switching element to automatically disconnect the at least one DC power supply from the energy source, wherein the reaching of the end of the recharging of all of said portable appliances is automatically determined by way of the measurement of the at least one current by the at least one current-measuring element allowing determination of the total power being consumed by all loads connected the recharging device, and
   iv) upon an automatic determination of the total power being consumed by all loads connected the recharging device, whether the total power being consumed exceeds a capacity of said at least one DC power supply source:
   a) when the total power being consumed is less than the capacity of said DC power supply source, applying the constant DC voltage simultaneously and continuously to all the portable appliances, and
   b) when the total power being consumed is greater the capacity of said DC power supply source, applying the constant DC voltage continuously to only a subset of said portable appliances until said subset is fully charged, and then applying the constant voltage continuously to remaining portable appliances of the portable appliances still to be recharged, until the remaining portable appliances are fully charged.

2. The system according to claim 1, further comprising one or more second sub-assemblies, each said second sub-assembly interfacing with a respective one of the first sub-assemblies,
each second sub-assembly comprising an output connection that connects to the charging port of a respective one of the portable appliances, and
each second sub-assembly having an input side that receives electric energy from an output side of the first sub-assembly and provides the constant DC voltage to the charging port of the respective portable appliance.

3. The system according to claim 2, further comprising:
guiding and/or maintaining means configured to position and hold at least one of said one or more second sub-assemblies in correspondence with said first sub-assembly for the interfacing of the one second sub-assembly in correspondence with said first sub-assembly.

4. The system according to claim 1, wherein said first sub-assembly includes a bearing surface configured to receive the charging port or the second sub-assembly of at least one of said two or more portable appliances to be recharged, said first sub-assembly configured to transfer electric energy to said one portable appliance by direct electric conduction.

5. The system according to claim 3, wherein said first and second sub-assemblies comprise contacts and/or inductors configured to be provided in a coupling position suitable for transferring electric energy through the effect of a force controlled by an electric command in connection with the charge condition of the portable appliance.

6. The system according to claim 1, wherein said first sub-assembly comprises inductors configured to transfer electric energy to at least one of said one or more portable appliances wirelessly by induction.

7. The system according to claim 1, wherein said first sub-assembly transfers electric energy to at least one of said one or more portable appliances via one or more wires comprising at least two contacts connectable to said one of said one or more portable appliances.

8. The system according to claim 7, wherein said first sub-assembly further comprises inductors configured to transfer electric energy to at least another of said one or more portable appliances wirelessly by induction.

9. The system according to claim 2, wherein at least one of said one or more second sub-assemblies further comprises a structure specific to one of said one or more portable appliances and configured to at least partly contact on a surface of the one of said one or more portable appliances and/or plugged in one of the charging port of the appliance.

10. The system according to claim 2, wherein said one or more second sub-assemblies comprise a connector configured to electrically connect a corresponding portable appliance with electric circuits of said second sub-assembly, said connector configured such that when interfaced with a power interface of a portable appliance, said connector is received completely within said interface and does not protrude from said power interface, said connector being connected to the electric circuits by a flexible means.

11. The system according to claim 1, wherein said means control circuit is also configured to open the switching element to automatically disconnect the at least one DC power supply from the energy source and thereby disconnect said at least one DC power supply source from the energy source upon a determination that a load corresponding to a power consumed by the recharging of said one or more portable appliances exceeds a predetermined threshold.

12. The system according to claim 2, wherein said one or more second sub-assemblies comprise means for providing access to at least one of the group consisting of: an indicator, a button, a hole, and a connector of the portable appliance.

13. The system according to claim 2, wherein said one or more second sub-assemblies comprise at least one additional one of the group consisting of: an indicator, a button, a hole, and a connector of the portable appliance.

14. The system according to claim 3, wherein at least one of said one or more second sub-assemblies comprise at least one contactless identification means enabling identification of a corresponding portable appliance and/or a user associated therewith.

15. The system according to claim 1, wherein the recharging device comprises at least one socket for recharging at least one of said one or more portable appliances via a cable.

16. The system according to claim 1,
wherein the recharging device comprises an audio recording and playback means for recording a voice message and for playing the recorded voice message upon connection of a portable appliance to said recharging device for recharging the battery of the one or more portable appliances, and
wherein the recharging device further comprises means for recognizing automatically an addressee of the recorded voice message upon initiating charging of a portable appliance associated with the addressee, the initiating of the charging of the portable appliance causing automatic playback of the recorded voice message intended for the recognized addressee.

17. A method using a universal recharging device to recharge two or more portable appliances that each have a rechargeable battery and a charging supervisor that manages a recharging current to recharge the rechargeable battery demanded by the respective portable appliance, said method comprising the steps of:
connecting an energy source to a recharging device comprised of at least one DC power supply, a start detection element operatively connected to the control circuit, at least one switching element, and a control circuit, the at least one DC power supply being connectable to and powered by the energy source via the at least one switching element, the control circuit further comprises at least one current-measuring element that measures at least one current for determining a total power being consumed by all loads connected the recharging device, wherein at least one first sub-assembly is connected to the recharging device, the at least one first sub-assembly operatively connectable to a charging port of each portable appliance, wherein the at least one DC power supply is configured to provide electric energy at a DC voltage to an input side of the at least one first sub-assembly, and said first sub-assembly is configured to transfer the electric energy to said one or more portable appliances,
bring the portable appliances to respective ones of the first sub-assemblies so that the charging port of the respective portable appliances is operatively connected to the first sub-assembly for being recharged;
wherein, with the at least one switching element closed, the at least one DC power supply is connected to the energy source so the energy source powers the at least one DC power supply to provide the electric energy at a constant DC voltage to the charging port of each of the portable appliances, for recharging the rechargeable battery of each of the portable appliances under control of the charging supervisor of the respective portable appliance, supplying a constant voltage of electric energy from the at least one DC power supply source to the charging port of each of the portable appliances to be recharged;

operating with the start detection element to detect a) a direct start command from a user,
   wherein the control circuit:
   i) when the user activates the start detection element, automatically closes the switching element to automatically connect the at least one DC power supply to the energy source, and
   ii) upon an automatic determination that all of said portable appliances are not being charged, opens the switching element to automatically disconnect the at least one DC power supply from the energy source, and
   iii) upon an automatic determination that an end of the recharging of all of said portable appliances has been reached, automatically opens the switching element to automatically disconnect the at least one DC power supply from the energy source, wherein the reaching of the end of the recharging of all of said portable appliances is automatically determined by way of the measurement of the at least one current by the at least one current-measuring element allowing determination of the total power being consumed by all loads connected the recharging device, and
   iv) upon an automatic determination of the total power being consumed by all loads connected the recharging device, whether the total power being consumed exceeds a capacity of said at least one DC power supply source:
      a) when the total power being consumed is less than the capacity of said DC power supply source, applying the constant DC voltage simultaneously and continuously to all the portable appliances, and
      b) when the total power being consumed is greater the capacity of said DC power supply source, applying the constant DC voltage continuously to only a subset of said portable appliances until said subset is fully charged, and then applying the constant voltage continuously to remaining portable appliances of the portable appliances still to be recharged, until the remaining portable appliances are fully charged, or c) each appliance being operatively connected to the at least first sub-assembly for recharging,
wherein the control circuit:
i) when the start detection element detects the user placing one of the appliance in the position with respect to the at least first sub-assembly to be recharged, automatically closes the switching element to automatically connect the at least one DC power supply to the energy source, and
ii) upon an automatic determination that all of said portable appliances are not being charged, opens the switching element to automatically disconnect the at least one DC power supply from the energy source, and
iii) upon an automatic determination that an end of the recharging of all of said portable appliances has been reached, automatically opens the switching element to automatically disconnect the at least one DC power supply from the energy source, wherein the reaching of the end of the recharging of all of said portable appliances is automatically determined by way of the measurement of the at least one current by the at least one current-measuring element allowing determination of the total power being consumed by all loads connected the recharging device, and
iv) upon an automatic determination of the total power being consumed by all loads connected the recharging device, whether the total power being consumed exceeds a capacity of said at least one DC power supply source:
   a) when the total power being consumed is less than the capacity of said DC power supply source, applying the constant DC voltage simultaneously and continuously to all the portable appliances, and
   b) when the total power being consumed is greater the capacity of said DC power supply source, applying the constant DC voltage continuously to only a subset of said portable appliances until said subset is fully charged, and then applying the constant voltage continuously to remaining portable appliances of the portable appliances still to be recharged, until the remaining portable appliances are fully charged.

18. The method according to claim 17, further comprising the steps of:
   interfacing one or more second sub-assemblies with a respective one of the first sub-assemblies, wherein each second sub-assembly comprising an output connection that connects to the charging port of a respective one of the portable appliances, and each second sub-assembly having an input side the receives the constant DC voltage from an output side of the first sub-assembly and provides the constant DC voltage to the charging port of the respective portable appliance; and
   arranging the charging port of the respective one of the portable appliances with the output connection of one of the second sub-assemblies, in order to provide the constant DC voltage to the charging port of the portable appliance, for recharging the rechargeable battery of the portable appliance under control of the charging supervisor of the portable appliance.

19. The method according to claim 18, further comprising the step of:
   interfacing the portable appliance with the one of the second sub-assemblies using a guiding and/or maintaining means configured to position and hold at least one of said one or more second sub-assemblies in correspondence with said first sub-assembly for the interfacing of the one second sub-assembly in correspondence with said first sub-assembly.

20. The system according to claim 2, wherein the second sub-assembly comprises a socket for recharging the portable appliance via a standard charger.

* * * * *